(12) United States Patent
Miyoshi et al.

(10) Patent No.: US 7,517,160 B2
(45) Date of Patent: Apr. 14, 2009

(54) OPTICAL MODULE

(75) Inventors: Makoto Miyoshi, Kawasaki (JP); Kazuya Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/068,744

(22) Filed: Feb. 11, 2008

(65) Prior Publication Data

US 2008/0232758 A1 Sep. 25, 2008

(30) Foreign Application Priority Data

Mar. 22, 2007 (JP) ............................. 2007-074861

(51) Int. Cl.
*G02B 6/36* (2006.01)
*G02B 6/42* (2006.01)

(52) U.S. Cl. ............................. 385/92; 385/53; 385/88

(58) Field of Classification Search ....................... None
See application file for complete search history.

(56) References Cited

U.S. PATENT DOCUMENTS

| 4,260,210 | A | * | 4/1981 | Babuka et al. ............... 439/347 |
| 5,901,263 | A | * | 5/1999 | Gaio et al. ..................... 385/92 |
| 6,430,053 | B1 | | 8/2002 | Peterson et al. |
| 6,439,918 | B1 | * | 8/2002 | Togami et al. .............. 439/372 |
| 6,830,385 | B2 | | 12/2004 | Ishigami et al. |
| 6,848,943 | B2 | | 2/2005 | Machado et al. |
| 7,083,336 | B2 | | 8/2006 | Kim et al. |
| 7,281,863 | B2 | * | 10/2007 | Yamada et al. ................ 385/92 |
| 7,351,090 | B1 | * | 4/2008 | Moore ......................... 439/372 |
| 2003/0142917 | A1 | | 7/2003 | Merrick |
| 2003/0198025 | A1 | | 10/2003 | Cao |
| 2003/0198026 | A1 | | 10/2003 | Bui |
| 2005/0141827 | A1 | | 6/2005 | Yamada et al. |
| 2005/0191013 | A1 | | 9/2005 | Sasaki et al. |
| 2005/0282425 | A1 | * | 12/2005 | Lloyd et al. .................. 439/372 |

FOREIGN PATENT DOCUMENTS

| JP | 2004-125860 | 4/2004 |
| JP | 2005-189684 | 7/2005 |
| JP | 2005-249892 | 9/2005 |
| WO | WO 03/090322 A1 | 10/2003 |
| WO | WO 2005/093482 A1 | 10/2005 |

\* cited by examiner

*Primary Examiner*—Tina M Wong
(74) *Attorney, Agent, or Firm*—Staas & Halsey LLP

(57) ABSTRACT

An optical module which can be inserted into and removed from a cage, the optical module includes a lock pin inserted into a lock hole provided in the cage and engaging the cage and the optical module with each other in a state where the optical module is inserted into the cage; a tongue having an axial part and configured to be rotated with respect to the axial part in a direction where the insertion of the lock pin into the lock hole is released; and a bail configured to be rotated with respect to a rotational axel so that the tongue is rotated. The engagement of the cage and the optical module formed by insertion of the lock pin into the lock hole is released by rotating the bail 90 degrees.

9 Claims, 25 Drawing Sheets

OPTICAL MODULE

BACKGROUND OF THE INVENTION

1. Field of the Invention

The present invention generally relates to optical modules used by communication devices for inputting and outputting electrical signals or optical signals. More specifically, the present invention relates to an optical module with a structure for locking the optical module.

2. Description of the Related Art

A communication device for inputting and outputting an electrical signal or an optical signal is designed in a module, and a module structure capable of inserting and removing an optical module into and from a module-receiving cage is known.

Examples of known communication devices designed in a module include an E/O module for converting an electrical data signal into an optical signal for transmission of the optical signal via an optical fiber, and an O/E module for converting an optical signal received via an optical fiber into an electrical data signal.

In the field of optical communication devices always aiming at a further size reduction, standardization of component specifications (MSA: Multi Source Agreement) is in progress and standards are specified regarding dimensions of the optical modules and cages, compatibility of optical/electrical interface units, and mechanical compatibility in inserting and removing the optical modules into and from the cages.

As a mechanism for inserting and removing the optical module into and from the cage, a structure, where a locking state of the optical module on the cage is turned off by rotating a bail of the optical module from a receiving position to a pulling-out position, is suggested in Japanese Patent Application Publication No. 2005-249892.

FIG. 1 is a perspective view of an inserting and removing mechanism of an optical communication device designed in a module seen from a lower side.

FIG. 1(A) shows a state where an optical module 1 is inserted in a cage 2. FIG. 1(B) shows where a locking state of the optical module 1 on the cage 2 is turned off by rotating a bail 3 of the optical module 1 from a receiving position to a pulling-out position in a direction indicated by an arrow 51. FIG. 1(C) shows the optical module 1 in the process of being removed from the cage 2 by the bail 3.

In FIG. 1(A), the bail 3 is rotated in the direction of arrow 50 to be oriented vertically in an embracing relationship with a connector-fitting unit 4. A lock pin 8 provided in a T-shaped tongue 7 of the optical module 1 is projected through a lock hole 6 formed in an I-shaped tongue 5 of the cage 2. Thus, the optical module 1 is held in the state locked to and restricted by the cage 2.

As shown in FIG. 1(B), when the bail 3 of the optical module 1 is rotated in the direction of arrow 51, plate cams 10 formed at the circumference of a rotational axle 9 are rotated in a direction of arrow 52 so that the T-shaped tongue 7 which is an elastic body is pushed down in a direction of arrow 53. Following the pushing-down of the T-shaped tongue 7, the I-shaped tongue 5 of the cage 2 is also flexed downward. As a result, the lock pin 8 projecting through the lock hole 6 is disengaged from the lock hole 6 so that the optical module 1 is released from being locked to the cage 2 to be freely movable.

As shown in FIG. 1(C), when the optical module 1 is pulled out in the direction of an arrow 54 while the bail 3 is rotated down, although the T-shaped tongue 7 is still pushed down, the I-shaped tongue 5 is separated from the T-shaped tongue 7 so as to be returned in a direction of an arrow 55 due to the elastic force of the I-shaped tongue 5.

FIG. 2 is a cut-away side view of a main part of the optical module 1 and shows cam operations of the bail 3.

As shown in FIG. 2(A), the optical module 1 is inserted in the cage 2 in a state where the bail 3 stands vertically, so that when a lock pin 8 projecting through a hole 11 moves, the I-shaped tongue 5 is urged in a lower direction and pushed down. Then, the lock pin 8 is engaged with the hole 11 of the housing 12 and the lock hole 6 of the cage 2 so that the I-shaped tongue 5 is stopped being urged. Thus, the optical module 1 is locked to the cage 2 so that insertion of the optical module 1 in the cage 2 is completed.

As shown in FIG. 2(B), in a case where the optical module 1 is removed from the cage 2, the bail 3 is operated in the direction of the arrow 51 so as to be rotated down and thereby the T-shaped tongue 7 is urged in the direction of the arrow 53 by the cam operations in the direction of the arrow 52 of the plate cam 10. As a result of this, the I-shaped tongue 5 of the cage 2 follows and is urged in the direction of the arrow 56 so that the lock pin 8 is removed from the hole 11 and the lock hole 6. By pulling the optical module 1 from the cage 2, when the lock pin 8 passes through the hole 11, the I-shaped tongue 5 is stopped being urged and returned to an original position.

In addition, Japanese Patent Application Publication No. 2005-189684 suggests an improved disconnect structure for SFP optical transceiver modules that uses a slide that travels relative to the module housing over a limited range. The slide has operating pieces which are elastically displaceable to elastically displace a spring plate of the cage in a direction to release the locked state. The slide initially moves relative to the module housing to deflect the spring plate downward and release the locked state. When the slide then reaches the end of its range of motion relative to the module housing, further withdrawal of the slide pulls the module housing along with it, removing the module from the cage.

Furthermore, Japanese Patent Application Publication No. 2004-125860 suggests a package having a lock mechanism which enables easy lock releasing and easy extraction and insertion of the package. The package having the lock mechanism includes a package main body provided with a nearly rectangular shaped body portion and a head portion positioned at the longitudinal front end of said body portion, a lever and a lever turning axle provided beneath the bottom of said head portion, said lever being provided so as to make a projection appear and disappear in a bottom plane of said body portion, with an acting end which has a projection and is extended to the body portion, and a forcing end existing at the front end of said head portion and being located at the opposite side of said acting end relative to said lever turning axle, a crank axle extending to the width direction of said package main body along the bottom of said head portion and fitting said forcing end of said lever to a crank portion, an arm which is integrated with said crank axle and is turnable along a side plane of said head portion, and a lever prolonged in the width direction of said package main body from said arm, when said lever is positioned over the head portion, said projection is exposed out of the bottom plane of said body portion, and when said lever is positioned in front of said head portion, said projection is accommodated in the bottom plane of said body portion.

In addition, United States Patent Application Publication No. 2003/0198025 and United States Patent Application Publication No. 2003/0198026 suggest a pluggable optical transceiver having a pivotable actuator assembly for quickly and easily removing the transceiver from a receptacle cage.

Furthermore, United States Patent Application Publication No. 2003/0142917 suggests a delatching mechanism including wedges that reside in pockets adjacent to a post on a module when the module is latched in a cage.

In addition, U.S. Pat. No. 6,439,918 suggests an integrated latching mechanism for use with a user pluggable electronic module, such as an optoelectronic transceiver module.

Furthermore, U.S. Pat. No. 6,430,053 suggests a pluggable transceiver module having a housing, an elongated member slidably mounted on the first side of the housing, a wedge on the internal end of the elongated member, and a rotatable lever.

In addition, International Application Publication No. 2005/093482 suggests an optical module that may be used in small-form factor pluggable applications and includes a delatching/latching mechanism.

Furthermore, International Application Publication No. 03/090322 suggests an advanced shielded modular plug connector assembly incorporating a removable insert assembly disposed in the connector housing, the insert assembly being adapted to optionally receive one or more electronic components.

Here, problems of the examples shown in FIG. 1 and FIG. 2 are discussed with reference to FIG. 3. In the examples shown in FIG. 1 and FIG. 2, engagement of the lock pin 8 and the lock hole 6 is achieved by holding the I-shaped tongue 5 due to the elastic force. Release of the engagement of the lock pin 8 and the lock hole 6 is achieved by rotating the bail 3 in the direction of the arrow 52 so that the elastic T-shaped tongue 7 is pushed down in the direction of the arrow 53 and the elastic I-shaped tongue 5 is bent downward.

Accordingly, due to degradation with time of the elastic T-shaped tongue 7 of the optical module 1, the engagement of the lock pin 8 and the lock hole 6 may become unstable. Furthermore, a fulcrum of downward bending of the T-shaped tongue 7 may not become stable so that the release of the engagement of the lock pin 8 and the lock hole 6 may not be performed stably.

In addition, as discussed above, when the bail 3 of the optical module 1 is rotated in the direction of the arrow 51 (see FIG. 2(b) and FIG. 3) in order to remove the optical module 1 from the cage 2 so that the bail 3 is rotated downward, the plate cam 10 is rotated in the direction of the arrow 52. Because of this, the elastic T-shaped tongue 7 is pushed in the direction of the arrow 53. As a result of this, a space S (see FIG. 3) is formed between the T-shaped tongue 7 and the lower surface of the optical module 1. If a stick shaped member such as a driver is inserted in this space S as shown in an unnumbered black arrow in FIG. 3, it may be possible to operate the T-shaped tongue 7.

In order to prevent access from outside to the T-shaped tongue 7, a wall part having a height (thickness) corresponding to the space S may be provided at a lower part of the optical module 1. However, since there is a limitation of the height of the optical module 1 in the standard MSA, it is not possible to provide a wall part which causes the optical module 1 to have a height (thickness) greater than that defined by the standard MSA.

SUMMARY OF THE INVENTION

Accordingly, embodiments of the present invention may provide a novel and useful optical module solving one or more of the problems discussed above.

More specifically, the embodiments of the present invention may provide an optical module having a structure where the optical module is released from a state locked to a cage by rotating a bail and a mechanism whereby engagement and release of the engagement of the optical module and a cage can be securely achieved, and it is possible to prevent access from outside to a tongue of the optical module in a range of dimensions defined by the standard MSA.

One aspect of the present invention may be to provide an optical module which can be inserted into and removed from a cage, the optical module including a lock pin inserted into a lock hole provided in the cage and engaging the cage and the optical module with each other in a state where the optical module is inserted into the cage; a tongue having an axial part and configured to be rotated with respect to the axial part in a direction where the insertion of the lock pin into the lock hole is released; and a bail configured to be rotated with respect to a rotational axel so that the tongue is rotated; wherein the engagement of the cage and the optical module formed by insertion of the lock pin into the lock hole is released by rotating the bail 90 degrees.

According to embodiments of the present invention, it is possible to provide an optical module having a structure where the optical module is released from a state locked to a cage by rotating a bail and a mechanism whereby engagement and release of the engagement of the optical module and a cage can be securely achieved, and it is possible to prevent access from outside to a tongue of the optical module in a range of dimensions defined by the standard MSA.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 4 through FIG. 26 of embodiments of the present invention.

First Embodiment of the Present Invention

Figure 4:
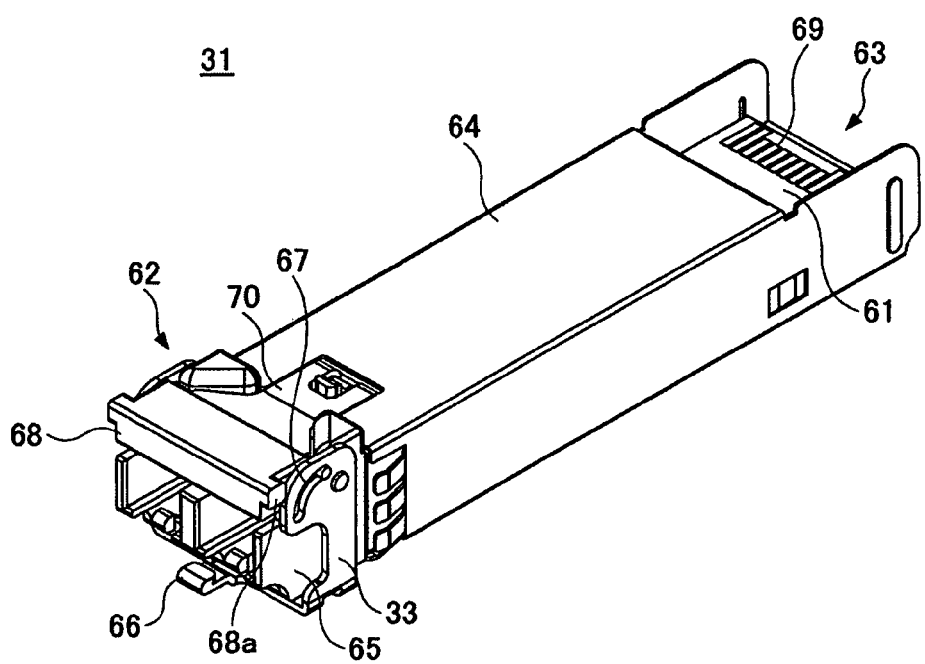
FIG. 4 is a perspective view of an optical module of a first embodiment of the present invention.

FIG. 4 is a perspective view of an optical module of a first embodiment of the present invention. In FIG. 4, for the convenience of explanation, a bottom surface side of the optical module is illustrated as an upper surface side of FIG. 4.

An optical module 31 includes a printed wiring board 61, an optical interface part 62, an electrical interface part 63, a housing 64, and others. Devices forming photoelectric conversion circuits or a power circuit are mounted on the printed wiring board 61. The optical interface part 62 is provided at one end in a longitudinal direction of the optical module 31. The electrical interface part 63 is provided at another end in the longitudinal direction of the optical module 31. The housing 64 receives the printed wiring board 61 and others.

A connector engaging part 65 is formed in the optical interface part 62. The connector engaging part 65 has an opening part for inserting and removing an optical fiber not shown in FIG. 4. Bails 33 are provided at both sides of the connector engaging part 65. The bails 33 can be rotated substantially 90 degrees at a maximum rotational angle. The bails 33 are connected to each other by a bail connection member 66 where a handling part extends. Elongated piercing holes 67 are formed on main surfaces of the bails 33 in substantially curved shapes.

In addition, a wall part 68 is formed at a lower part (an upper part in FIG. 4 where a bottom surface side of the-optical module 31 is shown as an upper surface side) of the connector engaging part 65. The wall part 68 has a height that is in a rage defined by a standard MSA.

A printed contact part 69 is provided at an end part of the printed wiring board 61 in the electrical interface part 63. When the optical module 31 is inserted into a cage 32 (see FIG. 5), a card edge connector and the printed contact part 69 are engaged with each other. The card edge connector is provided at a motherboard or the like not shown in FIG. 4 where the cage 32 is provided.

The housing 64 electromagnetically shields and mechanically protects the printed wiring board 61, the optical connector, and the like provided in the optical module 31.

The housing 64 is provided so as to cover three surfaces, not a bottom surface, of the optical module 31 or cover the circumference of the optical module 31 in a longitudinal direction.

A housing tongue 70 is provided between the housing 64 at a lower part (an upper part in FIG. 4 where a bottom surface side of the optical module 31 is shown as an upper surface side) of the optical module 31 and the optical interface part 62 so as to be exposed outside.

One end part of the housing tongue 70 is provided at the housing 64 via a shaft and another end part of the housing tongue 70 can be moved in the piercing holes 67 of the bails 33.

Figure 5:
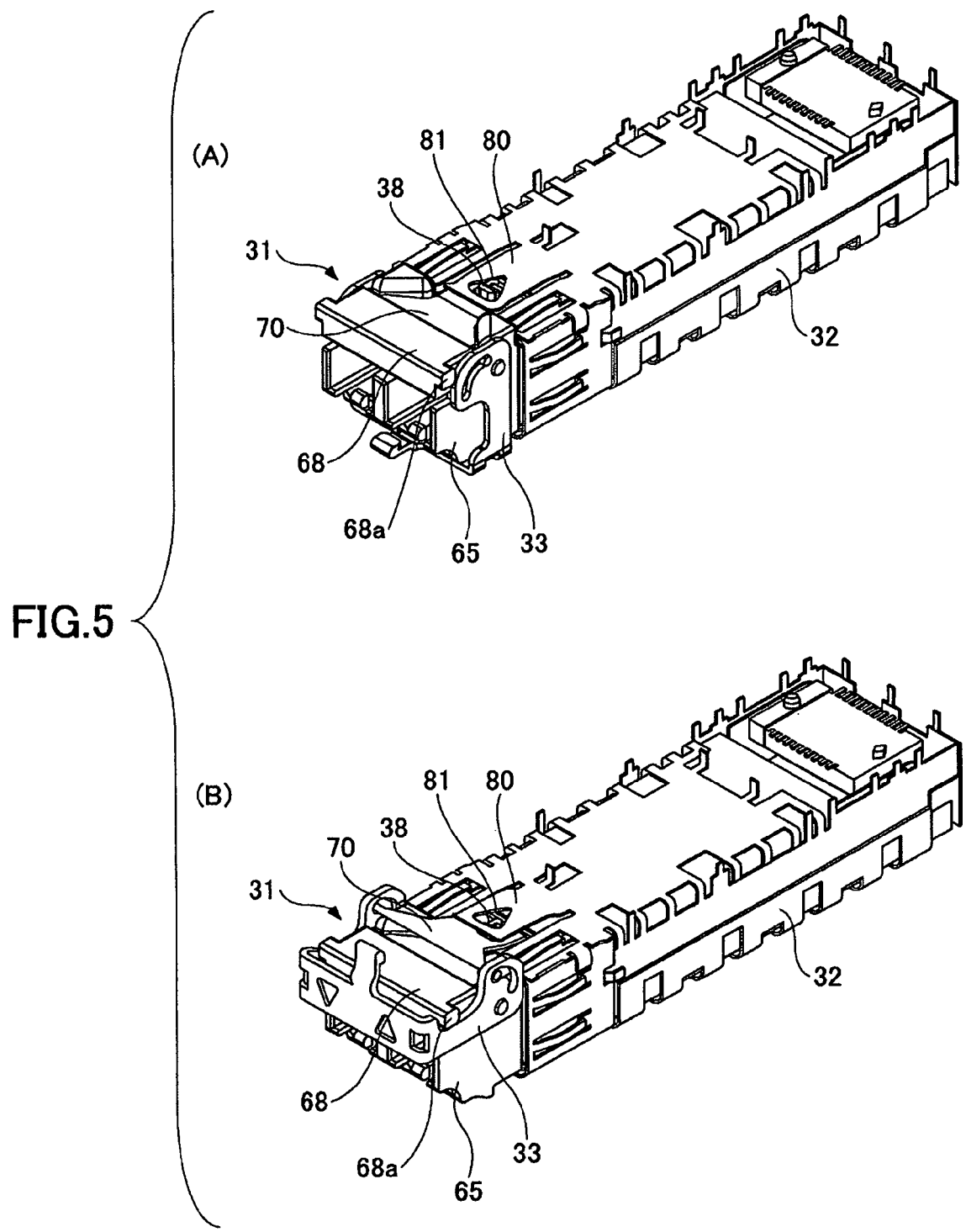
FIG. 5 is a perspective view of a state where the optical module shown in FIG. 4 is provided in a cage.

FIG. 5 is a perspective view of a state where the optical module 31 shown in FIG. 4 is provided in the cage 32. More specifically, FIG. 5(A) shows a state where the optical module 31 and the cage 32 are engaged with each other. FIG. 5(B) shows a position where the bails 33 are rotated so that engagement of the cage 32 and the optical module 31 is released. In FIG. 5, for the convenience of explanation, a bottom surface side of the cage 32 is illustrated as an upper surface side.

In FIG. 5(A), the cage 32 has a cage tongue 80 which can be deformed in an elevation angle. A lock hole 81 is formed in the cage tongue 80. In addition, the above-mentioned optical module 31 includes a lock pin 38. The optical module 31 and the cage 32 are engaged with each other by inserting the lock pin 38 into a hole 71 formed in the housing tongue 70 and the lock hole 81 of the cage 32.

As shown in FIG. 5(B), when the bails 33 are rotated 90 degrees from the state shown in FIG. 5(A), following the rotation of the bails 33, the housing tongue 70, having one end part provided at the housing 64 via the shaft and another end part which can be moved in the piercing holes 67 of the bails 33, is rotated. As a result of this, the cage tongue 80 follows and is urged in the elevation angle direction. Because of this, engagement of the lock pin 38 with the hole 71 (see FIG. 6(b)) formed in the housing tongue 70 and the lock hole 81 of the cage 32 is released so that the optical module 31 can be removed from the cage 32.

The rotation of the bails 33 can be limited by a rotation stopping part 68a. The rotation stopping part 68a extends from a side surface of the wall part 68 provided at a lower part (upper parts in FIG. 4 and FIG. 5 where the bottom surface side of the optical module 31 is shown as upper surface sides) in a direction perpendicular to the longitudinal direction of the optical module 31.

Next, structures of the bails 33 and the housing tongue 70 are discussed.

Figure 6:
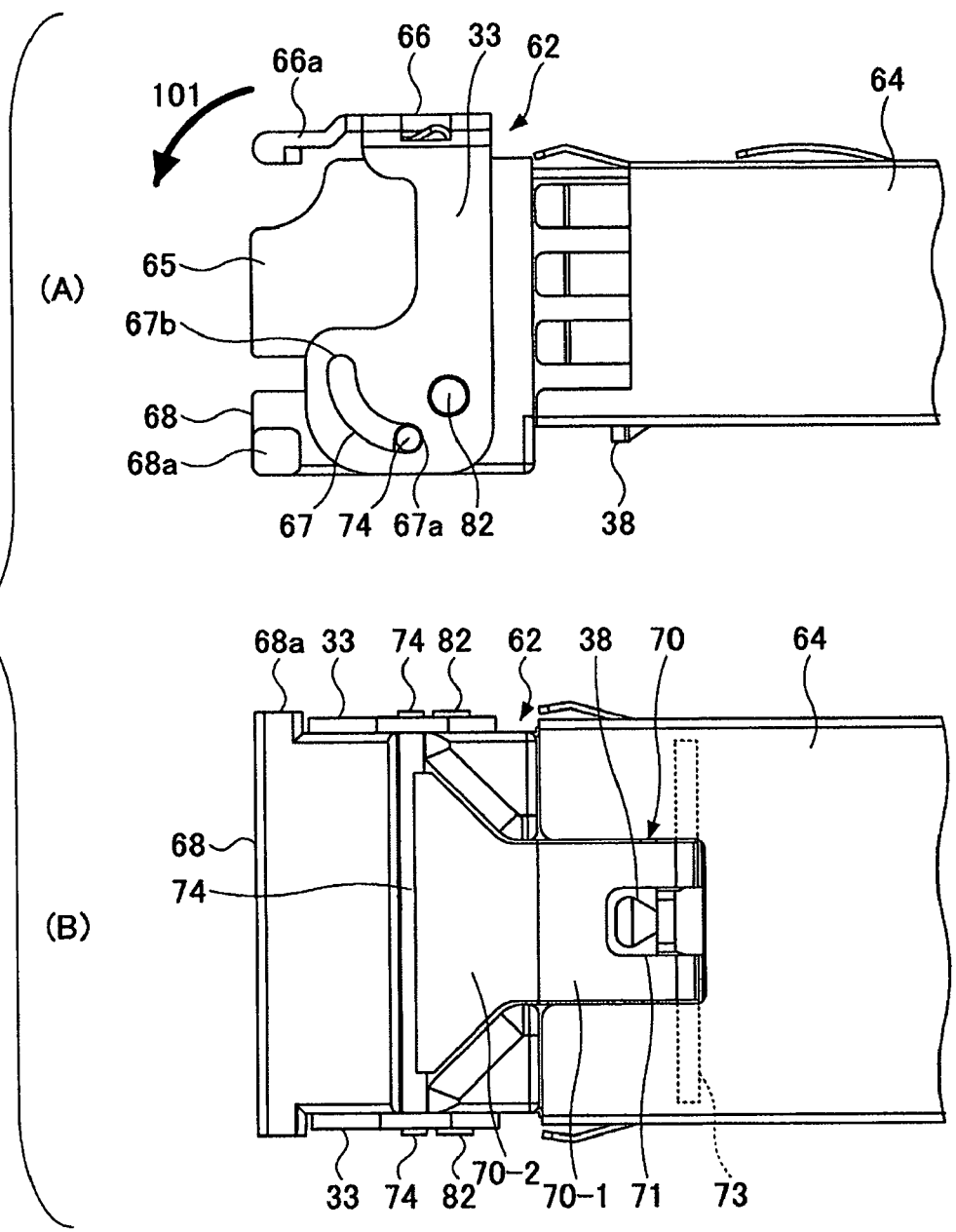
FIG. 6 is a view for explaining structures of a bail and a housing tongue.

FIG. 6 is a view for explaining structures of the bail 33 and the housing tongue 70. More specifically, FIG. 6(A) is a side view of the optical module 61 at the optical interface part 62 side and a part of the housing 64. FIG. 6(B) is a bottom view of the optical module 61 at the optical interface part 62 side and a part of the housing 64.

Referring to FIG. 6, the bails 33 are provided at both side surfaces of the connector engaging part 65 of the optical interface part 62. The bails 33 are connected to each other at an upper part by the bail connection member 66.

The bails 33 can be rotated with respect to a rotational axel 82 a maximum of 90 degrees in a direction indicated by an arrow 101 (see FIG. 6(A)) and a reverse direction. In addition, the piercing holes 67 are formed in the main surfaces of the bails 33.

Figure 7:
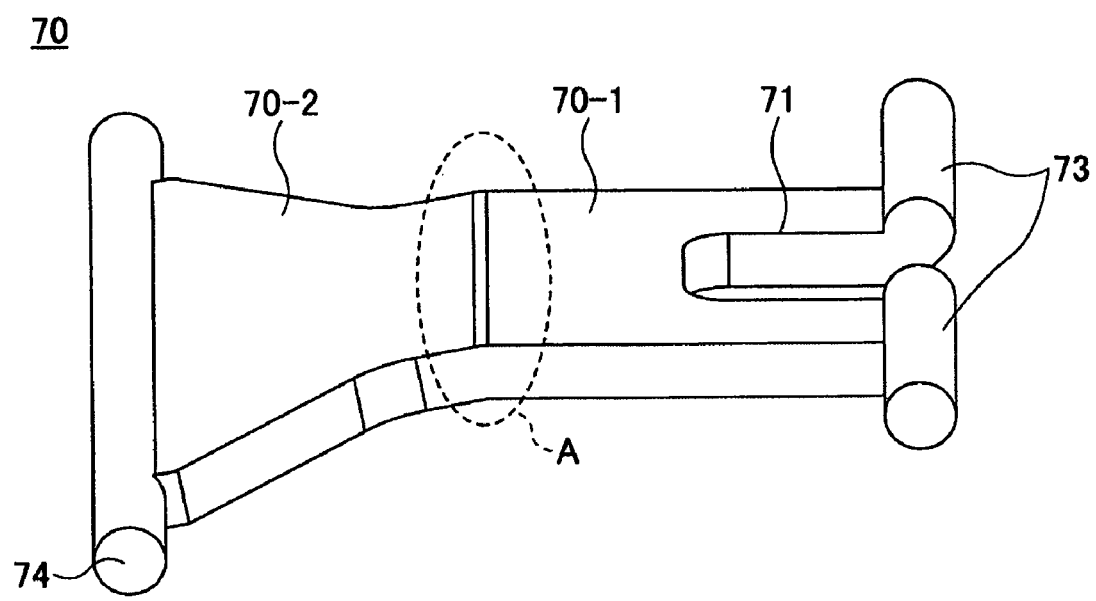
FIG. 7 is a perspective view of the housing tongue of the optical module shown in FIG. 4.

Next, the structure of the housing tongue 70 is discussed with reference to FIG. 7 in addition to FIG. 6.

The housing tongue 70 includes an engaging part 70-1 and a bail connecting part 70-2. The engaging part 70-1 has a substantially rectangular shaped plan configuration. The bail connecting part 70-2 is formed by extending from the engaging part 70-1 to the wall part 68 side of the connector engaging part 65.

The engaging part 70-1 and the bail connecting part 70-2 are formed in a body. The bail connecting part 70-2 extends from and is bent at a designated angle with the engaging part 70-1.

In the engaging part 70-1, the hole 71 is formed in the substantially center part in a direction perpendicular to the longitudinal direction of the engaging part 70-1. The lock pin 38 is inserted into or removed from the hole 71 and the lock hole 81 (see FIG. 5) of the cage 32, so that the optical module 31 and the cage 32 can be engaged with each other and the engagement can be released.

Axial parts 73 are provided at an end part of the engaging part 70-1 situated at a side opposite to a part where the bail connecting part 70-2 is provided. As shown by a dotted line in FIG. 6(B), both ends of the axial parts 73 are positioned in the housing 64.

On the other hand, as the bail connecting part 70-2 is farther from the engaging part to-1, the width of the bail connecting part 70-2 is greater.

At the end part at the wall part 68 side of the bail connecting part 70-2, a bail connecting pin 74 is formed with the bail connecting part 70-2 in a body. The bail connecting pin 74 has is a stick member having a substantially circular shaped cross section. The length of the bail connecting pin 74 is slightly longer than the width of the connector engaging part 65. The bail connecting pin 74 is inserted in the piercing holes 67 of the bails 33.

In the housing tongue 70 having the above-discussed structure, in a state where the optical module 31 and the cage 32 are engaged with each other as shown in FIG. 6(A), the engaging part 70-1 is substantially parallel with the cage tongue 80 (a horizontal surface).

Figure 8:
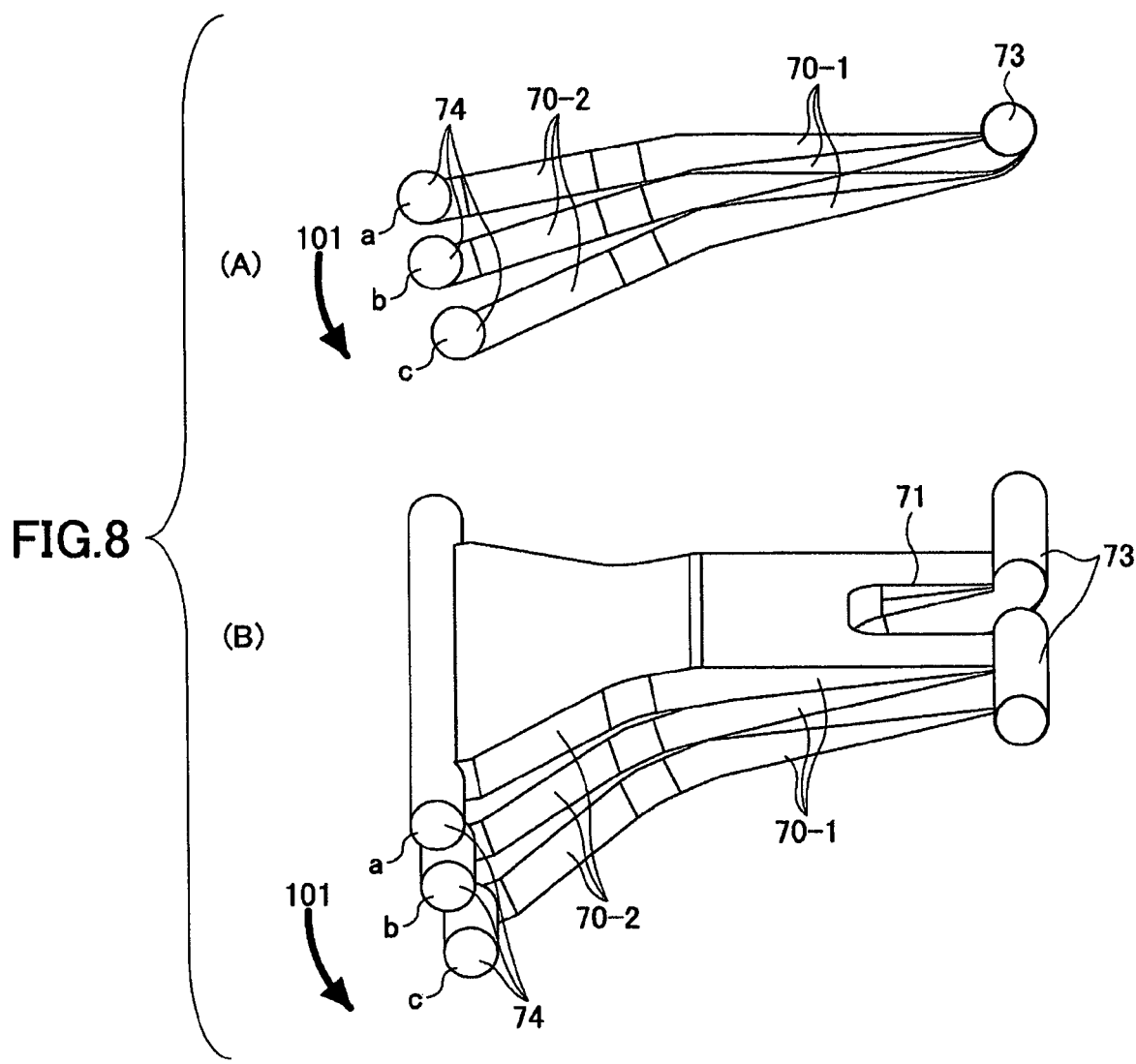
FIG. 8 is a view showing the rotation of the housing tongue shown in FIG. 7.

As shown in FIG. 8, when the bail connecting pin 74 provided at the end part of the wall part 68 side of the bail connecting part 70-2 moves downward from this engaged state, the entire housing part 70 is rotated with respect to the axial parts 73 of the engaging part 70-1 in a direction indicated by the arrow 101.

Here, FIG. 8(A) is a side view of the housing tongue 70 and FIG. 8(B) is a perspective view of the housing tongue 70.

In FIG. 8, "a" shows the housing tongue 70 in a state shown in FIG. 6(A) where the optical module 31 and the cage 32 are engaged with each other; "b" shows the housing tongue 70 in a position where the bails 33 having the piercing holes 67 where the bail connecting pin 74 is inserted are rotated 45 degrees in the direction indicated by the arrow 101 from the state of "a"; and "c" shows the housing tongue 70 in a position where the bails 33 having the piercing holes 67 where the bail connecting pin 74 is inserted are rotated 90 degrees in the direction indicated by the arrow 101 from the state of "a".

In the meantime, as discussed above, the engaging part 70-1 and the bail connecting part 70-2 are formed in a body. The bail connecting part 70-2 extends from and is bent at a designated angle with the engaging part 70-1.

In order to securely engage the optical module 31 with the cage 32, it is necessary to make the engaging part 70-1 be in parallel with the cage tongue 80 (horizontal surface) when the optical module 31 is engaged with the cage 32. However, if the bail connecting part 70-2 is also provided on the same surface with the engaging part 70-1, the bail connecting part 70-2 may come in contact with the rotational axel 82 (see FIG. 6) of the bail 33 and therefore prevent the rotational operations of the bails 33.

Accordingly, the engaging part 70-1 and the bail connecting part 70-2 are formed in a body. The bail connecting part 70-2 extends from and is bent at a designated angle with the engaging part 70-1. As a result this, clearance with the rotational axel 82 of the bails 33 is secured.

On the other hand, as the bail connecting part 70-2 is far from the engaging part 70-1, the width of the bail connecting part 70-2 is wider.

This is because, while the connection of the housing tongue 70 and the bails 33 is maintained via the bail connecting pin 74 and the piercing holes 67 of the bails 33 provided at both side surfaces of the connector engaging part 65, the rotation of the bail connecting part 70-2 due to the rotation of the bails 33 is efficiently transferred to the engaging part 70-1 formed in the substantially center part in a direction perpendicular to the longitudinal direction of the engaging part 70-1.

If the bail connecting part 70-2 has a substantially rectangular shaped configuration like the engaging part 70-1, a force necessary for moving the bail connecting pin 74 applied to a part surrounded by a dotted line A where the engaging part 70-1 and the bail connecting part 70-2 are connected to each other is too much.

On the other hand, as the bail connecting part 70-2 is farther from the engaging part 70-1, the width of the bail connecting part 70-2 is greater. Therefore, it is possible to reduce the force necessary for moving the bail connecting pin 74.

Under this structure, when the bails 33 are rotated in the direction indicated by the arrow 101 from the engaged state shown in FIG. 6 so that the rotational angle reaches the designated angle, the bail connecting pin 74 is pushed by the piercing holes 67 of the bails 33. As a result of this, the housing tongue 70 rotatably attached to the housing 64 by the axial part 73 is rotated with respect to the axial part 73 by following the rotational operations of the bails 33.

When the bails 33 are rotated 90 degrees in the direction indicated by the arrow 101 from the engaged state shown in FIG. 6, the lock pin 38 is removed from the hole 71 formed in the engaging part 70-1 of the housing tongue 70 and the lock hole 81 (see FIG. 5) of the cage 32 so that the engagement of the optical module 31 and the cage 32 is released.

Next, the rotational operations of the bails 33, movement of the housing tongue 71 following the rotational operations of the bails 33, and the configuration of the piercing holes 67 of the bails 33 for realizing the movement of the housing tongue 71 are discussed.

Figure 9:
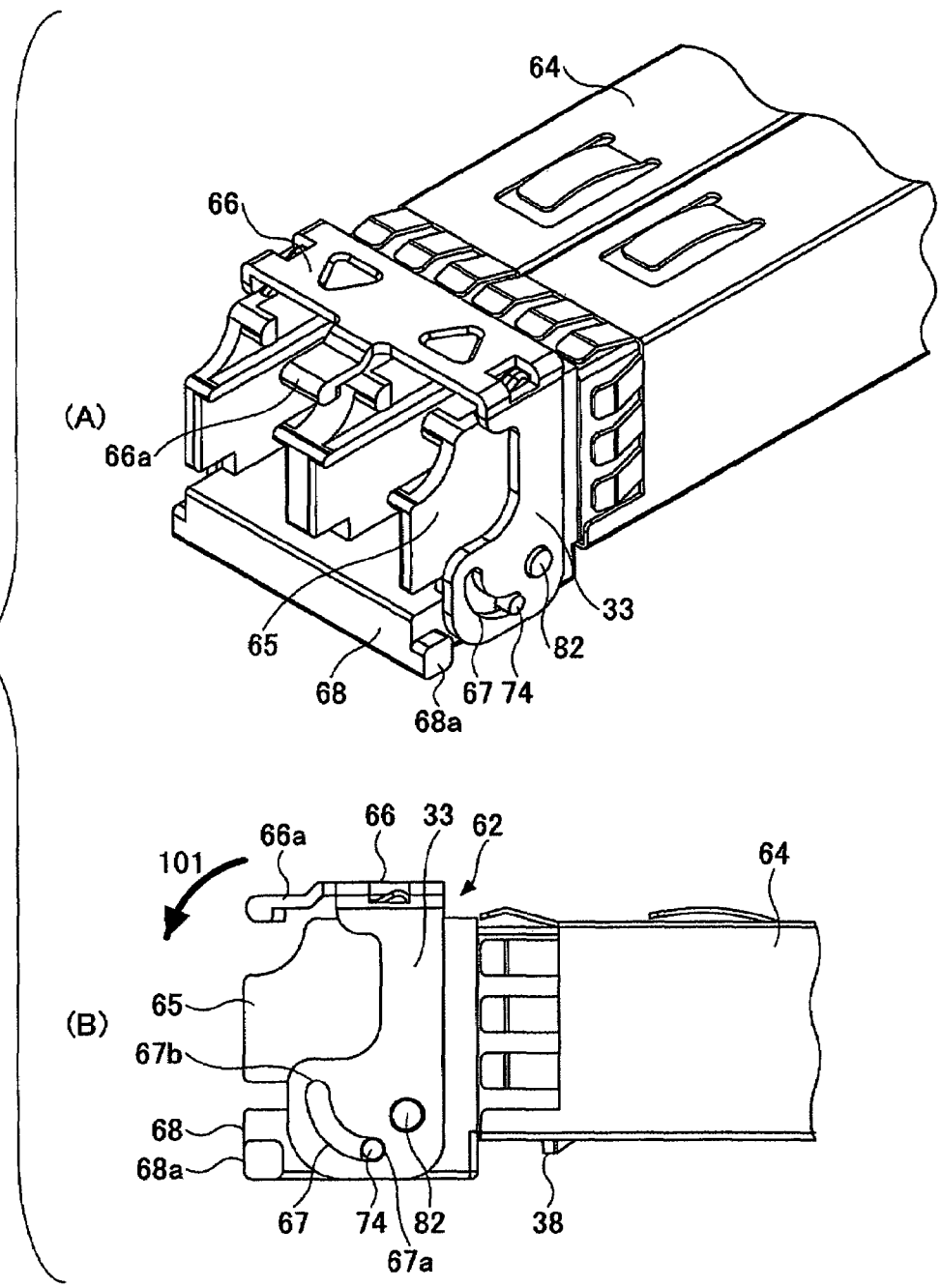
FIG. 9 is a first view showing a state where the optical module shown in FIG. 4 and the cage are engaged with each other.
Figure 10:
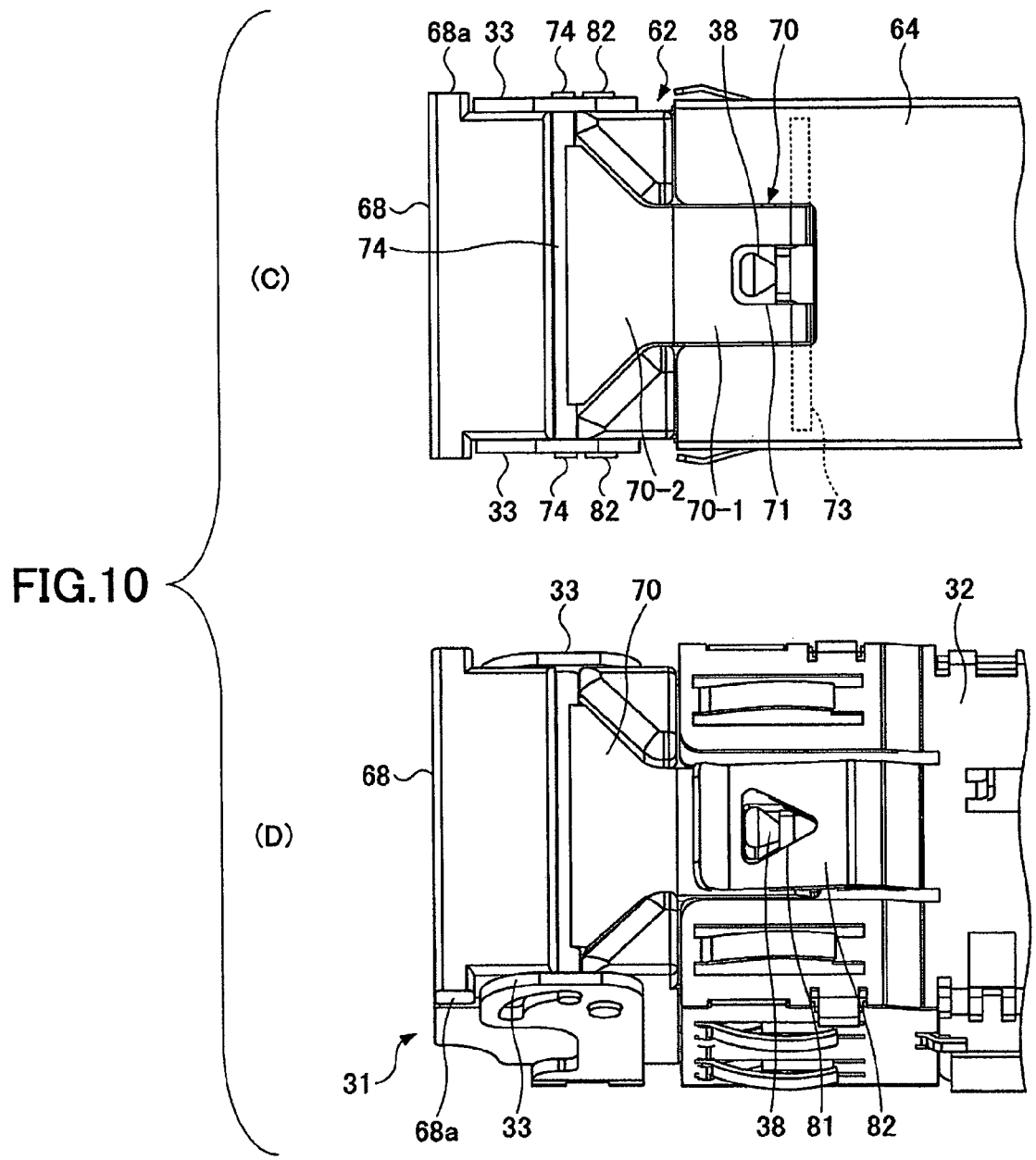
FIG. 10 is a second view showing a state where the optical module shown in FIG. 4 and the cage are engaged with each other.

FIG. 9 and FIG. 10 show a state where the bails 33 are received and the optical module 31 and the cage 32 are engaged with each other.

More specifically, FIG. 9(A) is a perspective view of the optical module 31 in a state where the bails 33 are received and the optical module 31 and the cage 32 are engaged with each other; FIG. 9(B) is a side view of the optical module 31 in a state where the bails 33 are received and the optical module 31 and the cage 32 are engaged with each other; FIG. 10(C) is a bottom view of the optical module 31 in a state where the bails 33 are received and the optical module 31 and the cage 32 are engaged with each other; and FIG. 10(D) is a bottom view of the optical module 31 and the cage in a state where the bails 33 are received and the optical module 31 and the cage 32 are engaged with each other.

In the state shown in FIG. 9 and FIG. 10, the lock pin 38 of the optical module 31 is inserted into the hole 71 formed in the housing tongue 70 and the engaging hole 81 of the cage tongue 80 so that the optical module 31 and the cage 32 are engaged with each other.

In this state, the bail connecting pin 74 formed at the bail connecting part 70-2 of the housing tongue 70 comes in contact with a first end part 67a of the piercing hole 67 positioned near the rotational axel 82 of the bail 33 so that a force in a left direction in FIG. 9(B) is applied to the bail connecting pin 74 by the contact part 67a.

Figure 3:
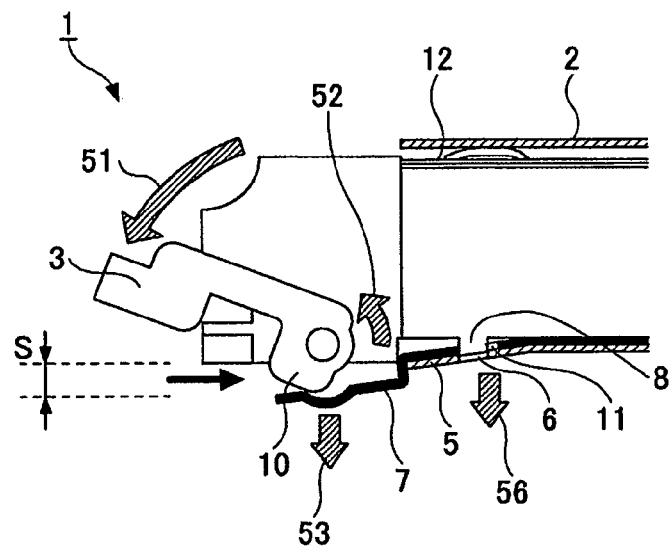
FIG. 3 is a view for explaining problems of the mechanism for inserting and removing the optical module shown in FIG. 1 and FIG. 2.

Furthermore, the bail connecting pin 74 of the housing tongue 70 is positioned in a height direction in a part where the wall part 68 formed at the lower part of the connector engaging part 65 of the optical module 31 is provided. The access from outside to the housing tongue 70 in a direction indicated by a black arrow in FIG. 3 is prevented by the wall part 68.

Figure 11:
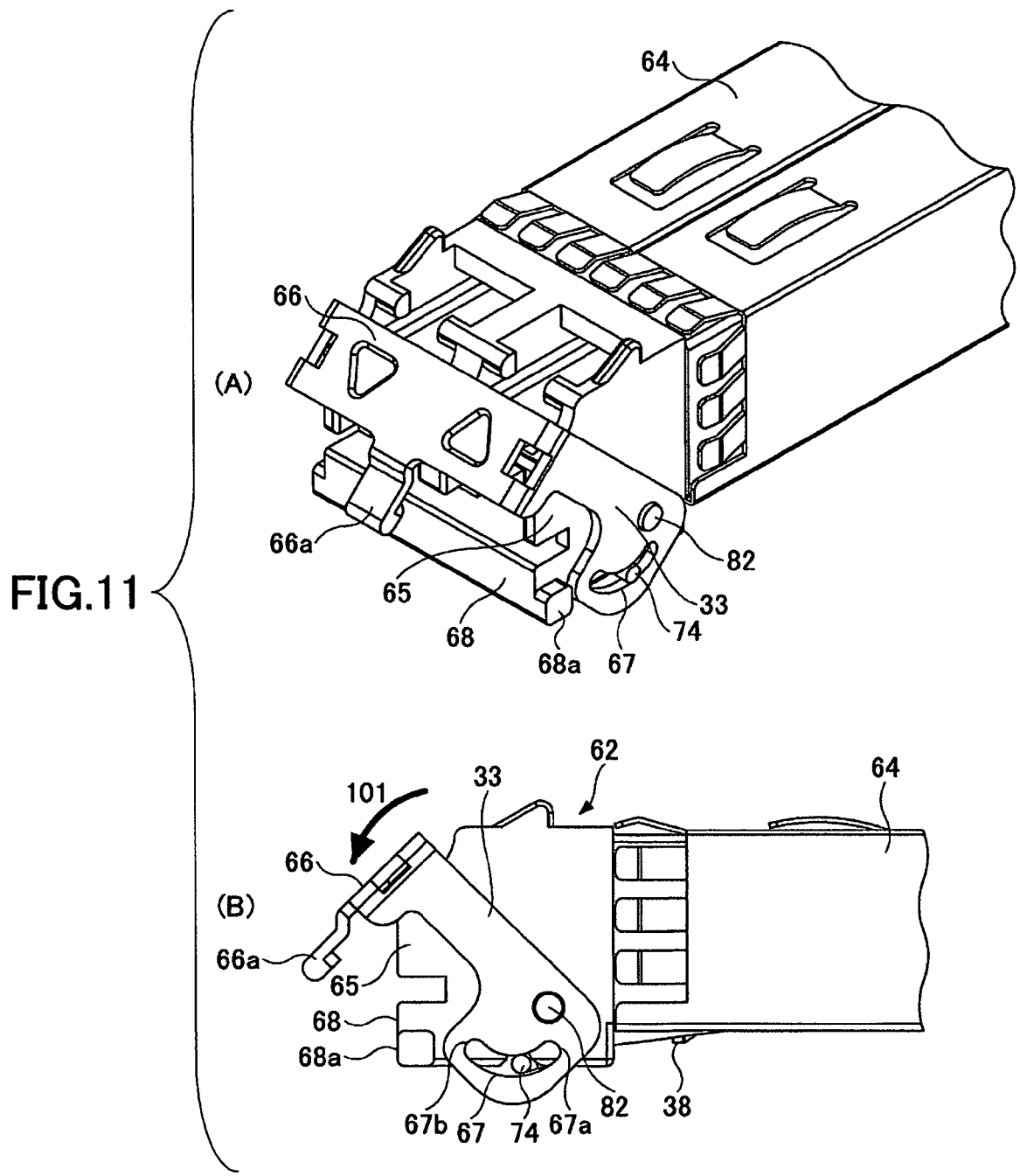
FIG. 11 is a first view showing where the bail is rotated 45 degrees from the state shown in FIG. 9 and FIG. 10.
Figure 12:
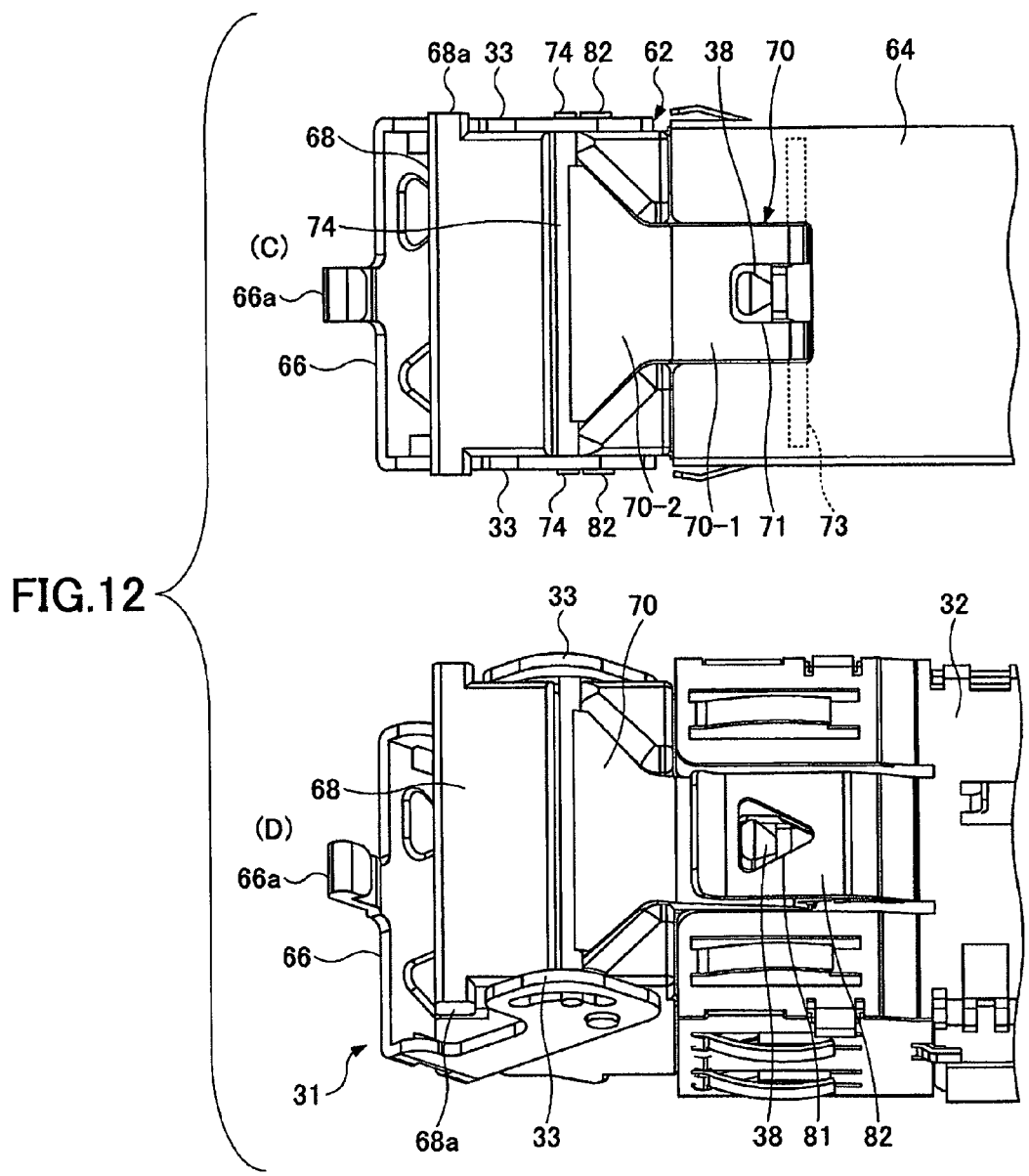
FIG. 12 is a second view showing where the bail is rotated 45 degrees from the state shown in FIG. 9 and FIG. 10.

Next, FIG. 11 and FIG. 12 show where the bails 33 are rotated 45 degrees in a direction indicated by an arrow 101 (see FIG. 9(B)).

More specifically, FIG. 11(A) is a perspective view of the optical module 31 in a position where the bails 33 are rotated 45 degrees in a direction indicated by arrow 101 (see FIG. 9(B)); FIG. 11(B) is a side view of the optical module 31 in a position where the bails 33 are rotated 45 degrees in a direction indicated by the arrow 101 (see FIG. 9(B)); FIG. 12(C) is a bottom view of the optical module 31 in a position where the bails 33 are rotated 45 degrees in a direction indicated by the arrow 101 (see FIG. 9(B)); and FIG. 12(D) is a bottom view of the optical module 31 and the cage in a position where the bails 33 are rotated 45 degrees in a direction indicated by the arrow 101 (see FIG. 9(B)).

While the bail connecting pin 74 of the housing tongue 70 is separated from the end part 67a of the piercing hole 67, the bail connecting pin 74 is still positioned in a height direction in a part where the wall part 68 formed at the lower part of the connector engaging part 65 of the optical module 31 is provided. Accordingly, the access from outside to the housing tongue 70 in a direction indicated by a black arrow in FIG. 3 is prevented by the wall part 68.

Figure 13:
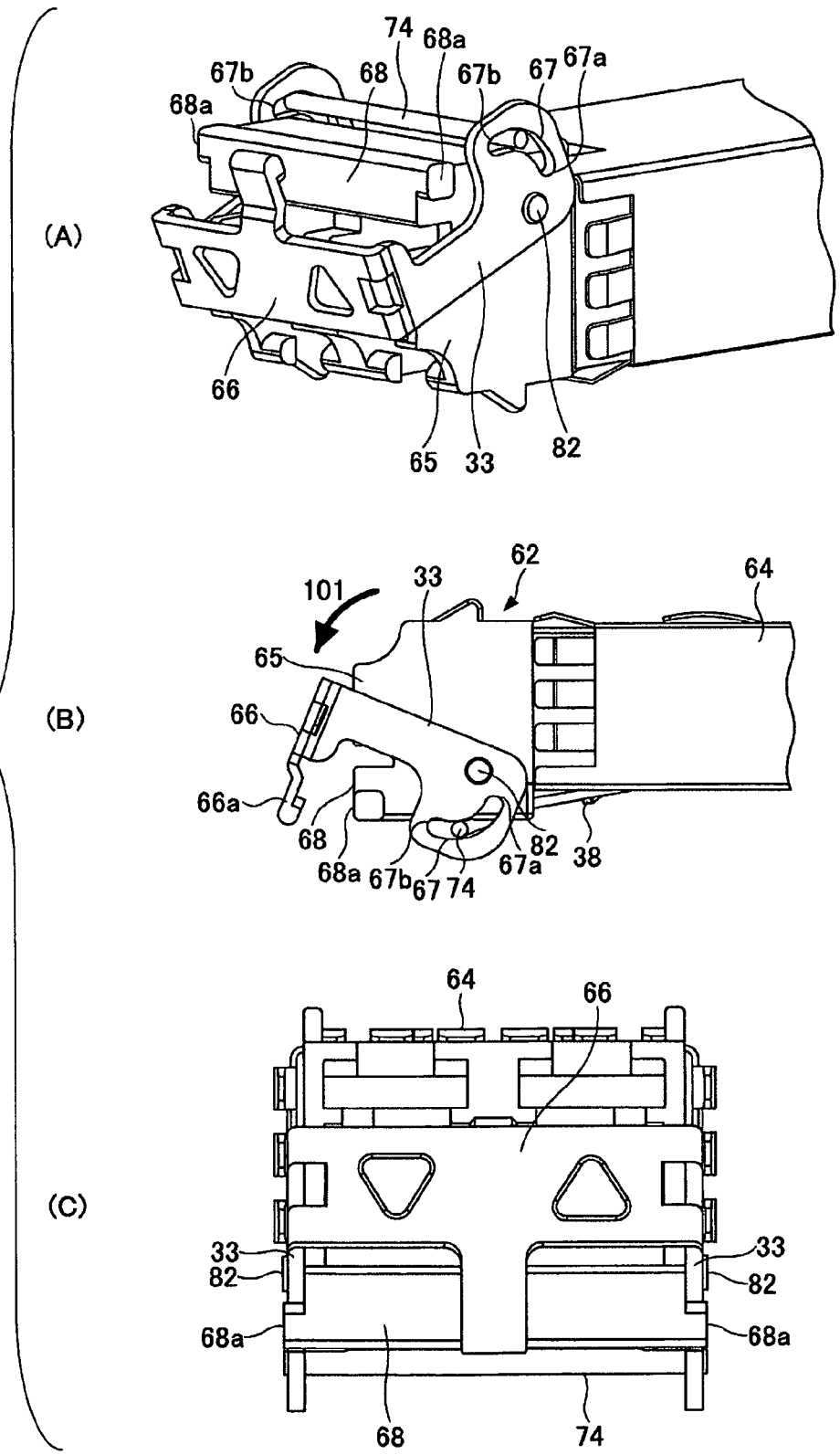
FIG. 13 is a view showing where the bail is rotated, for example, approximately 70 degrees from the state shown in FIG. 9 and FIG. 10.

Next, a position where the bails 33 are rotated 25 degrees in a direction indicated by the arrow 101 (see FIG. 9(B)) from the position shown in FIG. 11 and FIG. 12, namely a position where the bails 33 are rotated at 70 degrees in a direction indicated by arrow 101 (see FIG. 9(B)) from the engaged state shown in FIG. 9 and FIG. 10, is shown in FIG. 13.

More specifically, FIG. 13(A) is a perspective view of the optical module 31 in a position where the bails 33 are rotated 25 degrees in a direction indicated by the arrow 101 (see FIG. 9(B)) from the position shown in FIG. 11 and FIG. 12; FIG. 11(B) is a side view of the optical module 31 in a position where the bails 33 are rotated 25 degrees in a direction indicated by the arrow 101 (see FIG. 9(B)) from the position shown in FIG. 11 and FIG. 12; and FIG. 12(C) is a front view of the optical module 31 in a position where the bails 33 are rotated 25 degrees in a direction indicated by the arrow 101 (see FIG. 9(B)) from the position shown in FIG. 11 and FIG. 12. In FIG. 13(A), for the convenience of explanation, the bottom surface side of the optical module 31 is shown as an upper surface side in FIG. 13(A).

When the bails 33 are rotated in the direction indicated by the arrow 101 (see FIG. 11(B)) from the position shown in FIG. 11 and FIG. 12, for example approximately 60 degrees from the engaged state shown in FIG. 9 and FIG. 10, the bail connecting pin 74 of the housing tongue 70 comes in contact with the external circumference of the piercing hole 67 and starts being pushed by the external circumference of the piercing hole 67, so that the bail connecting pin 74 starts moving by following the rotation of the bails 33.

As shown in FIG. 13(B) and FIG. 13(C), at the time when the bails 33 are rotated in the direction indicated by the arrow 101 (see FIG. 9(B)), for example, approximately 70 degrees from the states shown in FIG. 9 and FIG. 10, the bail connecting pin 74 of the housing tongue 70 begins being visible from the lower surface of the wall part 68.

In order to securely release the engagement of the optical module 31 and the cage 32, it is necessary to remove the lock pin 38 from the hole 71 of the engagement part 70-1 and the engagement hole 81 (see FIG. 5) of the cage 32. Because of this, it is possible to move the bail connecting pin 74 of the housing tongue 70 downward. On the other hand, it is necessary to prevent the access indicated by a black arrow in FIG. 3 from the outside to the housing tongue 70.

As discussed above, the height of the wall part 68 has limitations according to the standard MSA. Therefore, it is not possible to make the wall part 68 have a height greater than the designated length. Accordingly, as shown in FIG. 13, it is not possible to prevent the access from the outside to the housing tongue 70 by the wall part 68.

However, assuming that the optical module 31 is seen from a front surface, at the time when the bails 33 are rotated in the direction indicated by the arrow 101 (see FIG. 9(B)) from the state shown in FIG. 9 and FIG. 10, as shown in FIG. 13(C), the end part of the bail connecting member 66 configured to connect the bails 33 to each other, namely the handling part 66a of the bail connecting member 66, is positioned so as to be overlapped with the bail connecting pin 74.

Accordingly, the access from the outside to the housing tongue 70 in a direction indicated by a black arrow in FIG. 3 is prevented by the bail connecting member 66, namely the handling part 66a of the bail connecting member 66 in the example shown in FIG. 13.

Figure 14:
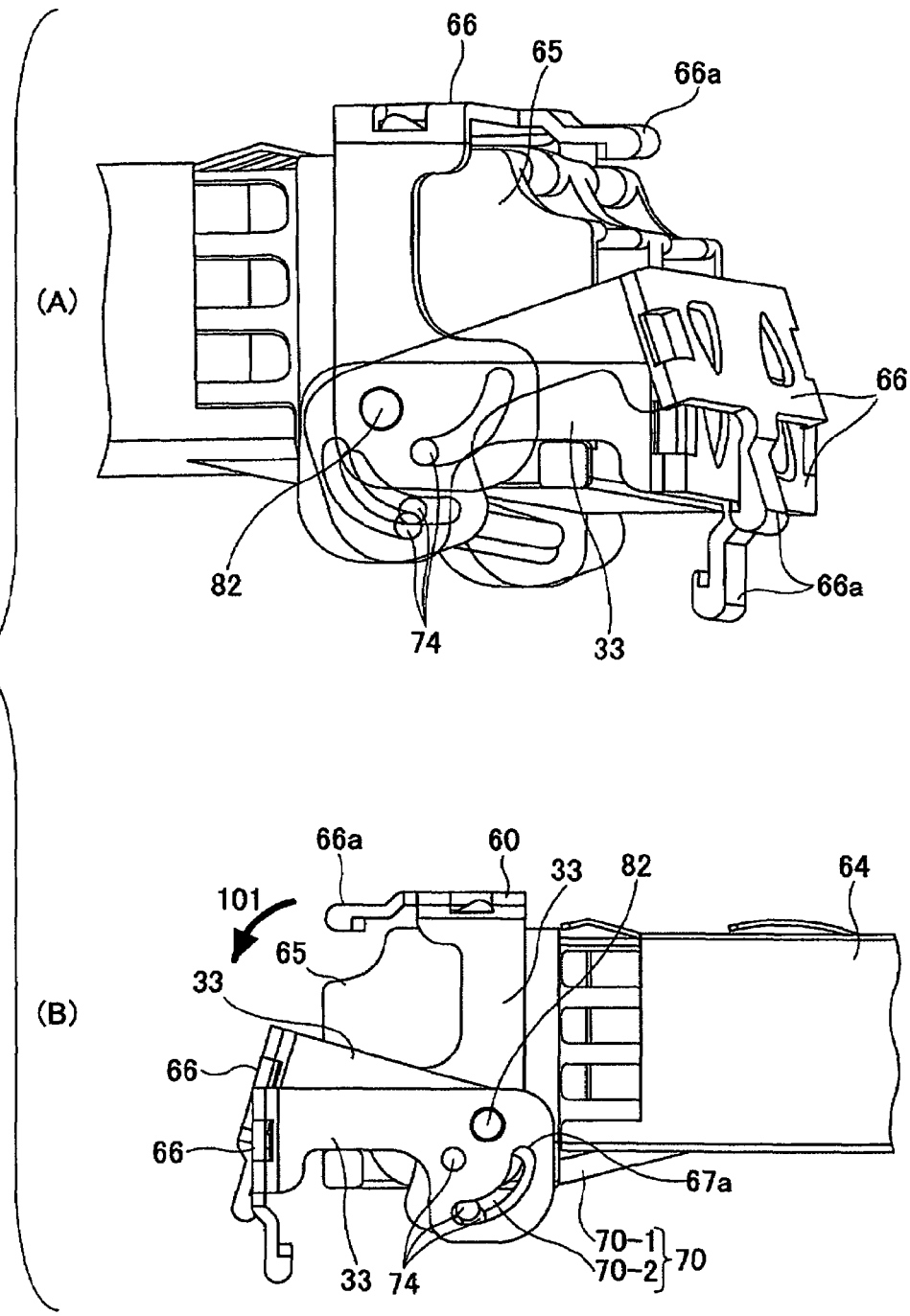
FIG. 14 is a first view showing where the bail and the housing tongue are rotated 90 degrees from the state shown in FIG. 9 and FIG. 10.
Figure 15:
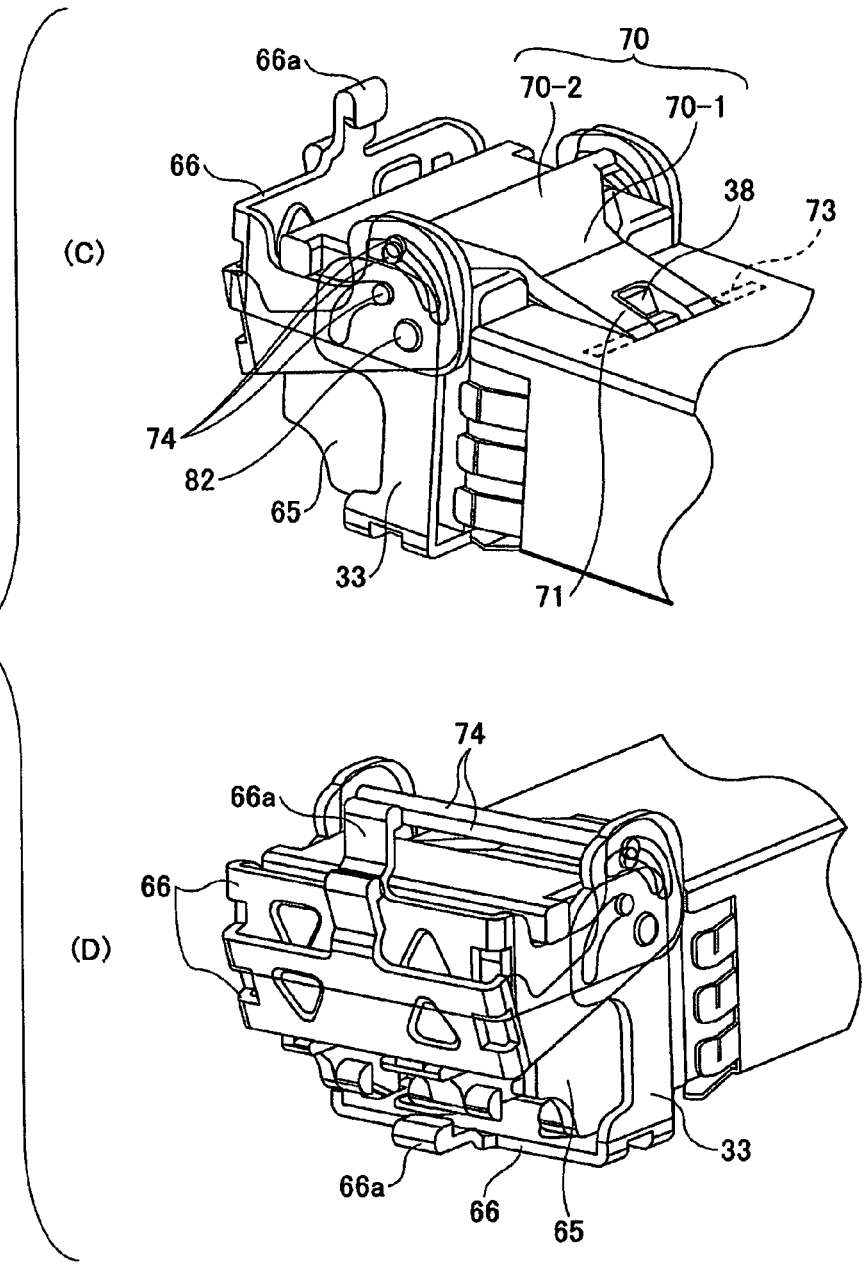
FIG. 15 is a second view showing where the bail and the housing tongue are rotated 90 degrees from the state shown in FIG. 9 and FIG. 10.

Next, positions of the bails 33 and the housing tongue 70 when the bails 33 are rotated in the direction indicated by the arrow 101 (see FIG. 11(B)) approximately 20 degrees from the position shown in FIG. 13, namely in the direction indicated by the arrow 101 (see FIG. 9(B)) at approximately 90 degrees from the engaged state shown in FIG. 9 and FIG. 10, are shown in FIG. 14 and FIG. 15.

FIG. 14(A) is a perspective view of the optical module 31; FIG. 14(B) is a side surface view of the optical module 31; FIG. 15(C) is a perspective view of the optical module 31 seen from the engaging part 70-1 side of the housing tongue 70; and FIG. 15(D) is a perspective view of the optical module 31 seen from the front surface side.

In FIG. 15, for the convenience of explanation, the bottom surface side of the optical module 31 is shown as an upper surface side in FIG. 15. In addition, for reference, the bails 33 and the housing tongue 70 in the state shown in FIG. 9 and FIG. 10 are shown in FIG. 14 and FIG. 15.

When the bails 33 are rotated in the direction indicated by the arrow 101 (see FIG. 14(B)) from the position shown in FIG. 13, the bail connecting pin 74 of the housing tongue 70 is further pushed by the external circumferential part of the piercing hole 67 and moves. In other words, the housing tongue 70 is further rotated with respect to the axial part 73 by following the rotation of the bails 33.

As a result of this, the engaging part 70-1 of the housing tongue 70 moves so as to push the cage tongue 80 of the cage 32, so that the insertion of the lock pin 38 in the hole 71 of the housing tongue 70 and the lock hole 81 of the cage tongue 80 becomes shallow.

Thus, when the bails 33 are rotated 90 degrees in the direction indicated by the arrow 101 (see FIG. 14(B)) from the state shown in FIG. 9 and FIG. 10, the housing tongue 70 is rotated by following the rotation of the bails 33 and the cage 80 follows this and is urged. Because of this, the engagement of the lock pin 38 with the hole 71 of the housing tongue 70 and the lock hole 81 of the cage 32 is released so that the optical module 31 can be pulled out and removed from the cage 32.

As shown in FIG. 14 and FIG. 15, in steps for rotating the bails 33 in the direction indicated by the arrow 101 (see FIG. 14(B)) from the position shown in FIG. 13, the bail connecting pin 74 of the housing tongue 70 can be seen from the lower surface of the wall part 68. However, when the optical module 31 is seen from the front surface in this position, since the bail connecting member 66 is positioned so as to substantially overlap the bail connecting pin 74, the access from the outside to the housing tongue 70 in a direction indicated by a black arrow in FIG. 3 is prevented by the bail connecting member 66.

Figure 16:
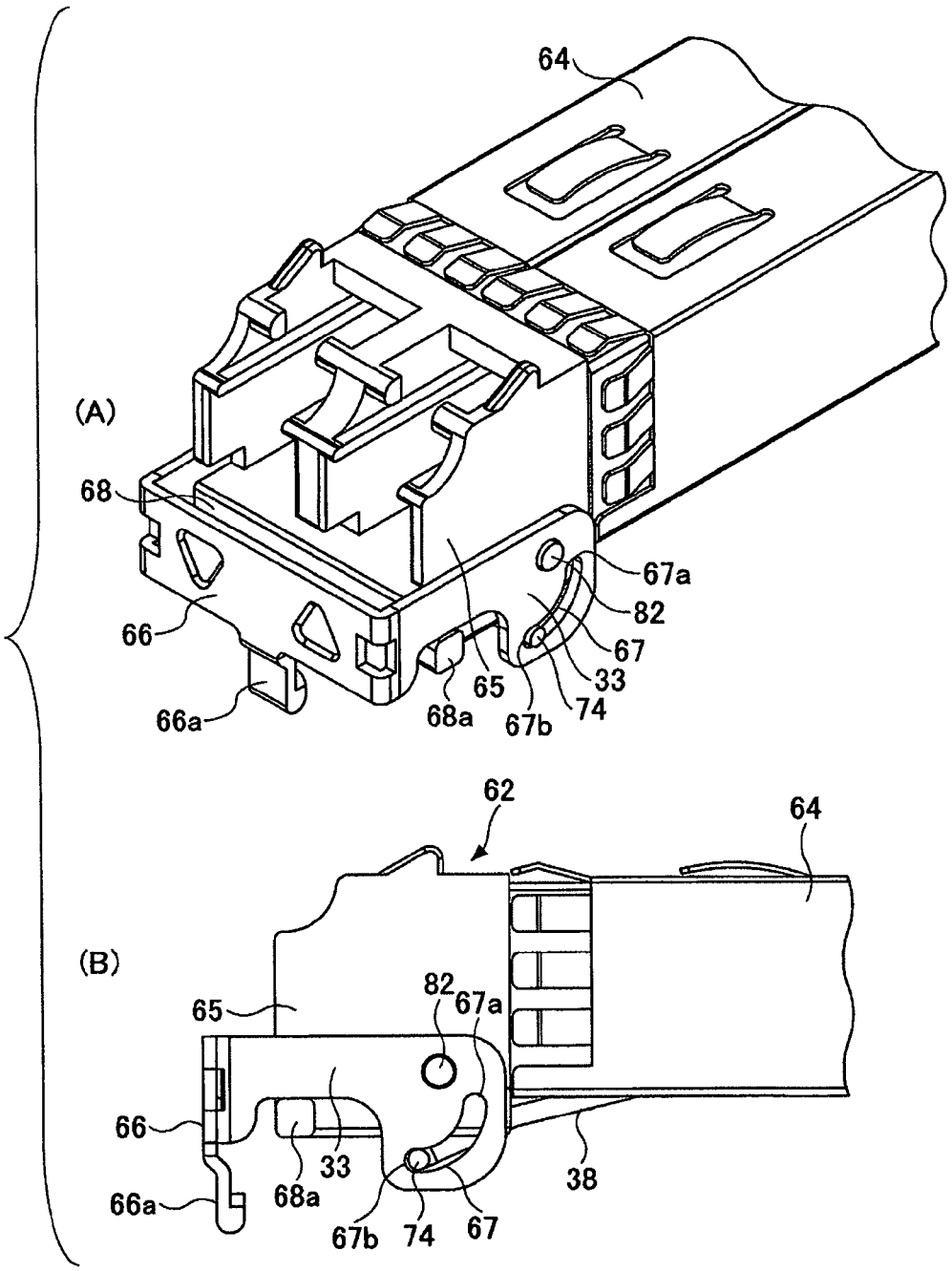
FIG. 16 is a first view showing where the bail is rotated 90 degrees from the state shown in FIG. 9 and FIG. 10.
Figure 17:
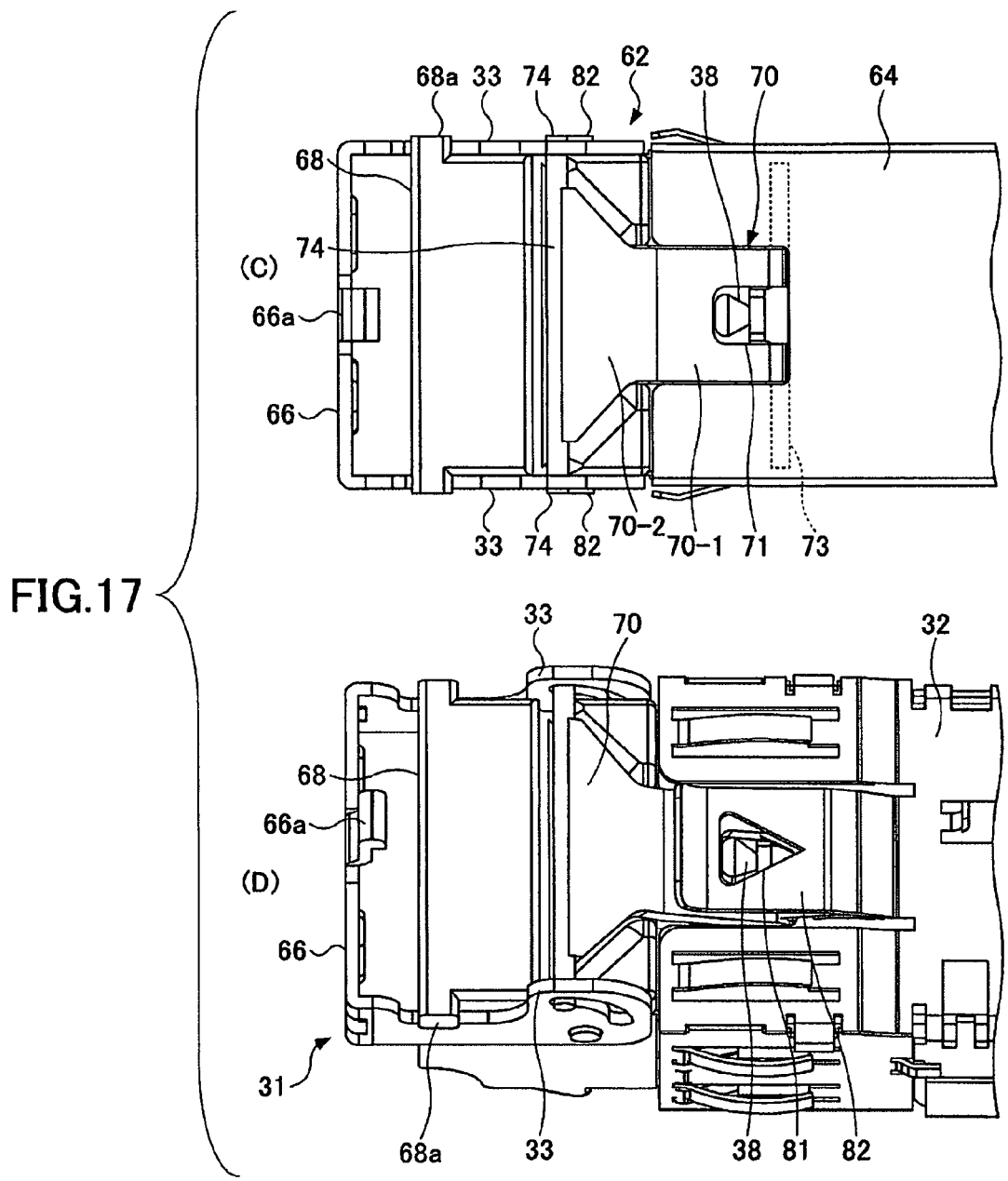
FIG. 17 is a second view showing where the bail is rotated 90 degrees from the state shown in FIG. 9 and FIG. 10.

A position where the bails 33 are rotated 90 degrees in the direction indicated by the arrow 101 (see FIG. 9(B)) from the state shown in FIG. 9 and FIG. 10 is shown in FIG. 16 and FIG. 17.

FIG. 16(A) is a perspective view of the optical module 31 in the position where the bails 33 are rotated 90 degrees in the direction indicated by the arrow 101 (see FIG. 9(B)) from the state shown in FIG. 9 and FIG. 10; FIG. 16(B) is a side surface view of the optical module 31 in the position where the bails 33 are rotated 90 degrees in the direction indicated by the arrow 101 (see FIG. 9(B)) from the state shown in FIG. 9 and FIG. 10; FIG. 17(C) is a bottom view of the optical module 31 in the position where the bails 33 are rotated 90 degrees in the direction indicated by the arrow 101 (see FIG. 9(B)) from the state shown in FIG. 9 and FIG. 10; and FIG. 17(D) is a bottom view of the optical module 31 and the cage 32 where the bails 33 are rotated 90 degrees in the direction indicated by the arrow 101 (see FIG. 9(B)) from the state shown in FIG. 9 and FIG. 10.

The bail connecting pin 74 of the housing tongue 70 comes in contact with the second end part 67b of the piercing hole 67 situated at a side opposite to the first end part 67a. In cooperation with the rotation stopping part 68a of the wall part 68, by the contact of the bail connecting pin 74 and the second end part 67b, further rotation of the bails 33 is limited. Hence, the bail connecting pin 74 of the housing tongue 70 is prevented from being situated further downward from this position.

As shown in FIG. 16 and FIG. 17, the lock pin 38 is released from the hole 71 of the housing tongue 70 and the lock hole 81 of the cage 32. Hence, the engagement with cage 32 and the optical module 31 is released so that the optical module 31 can be pulled out from the cage 32.

Figure 18:
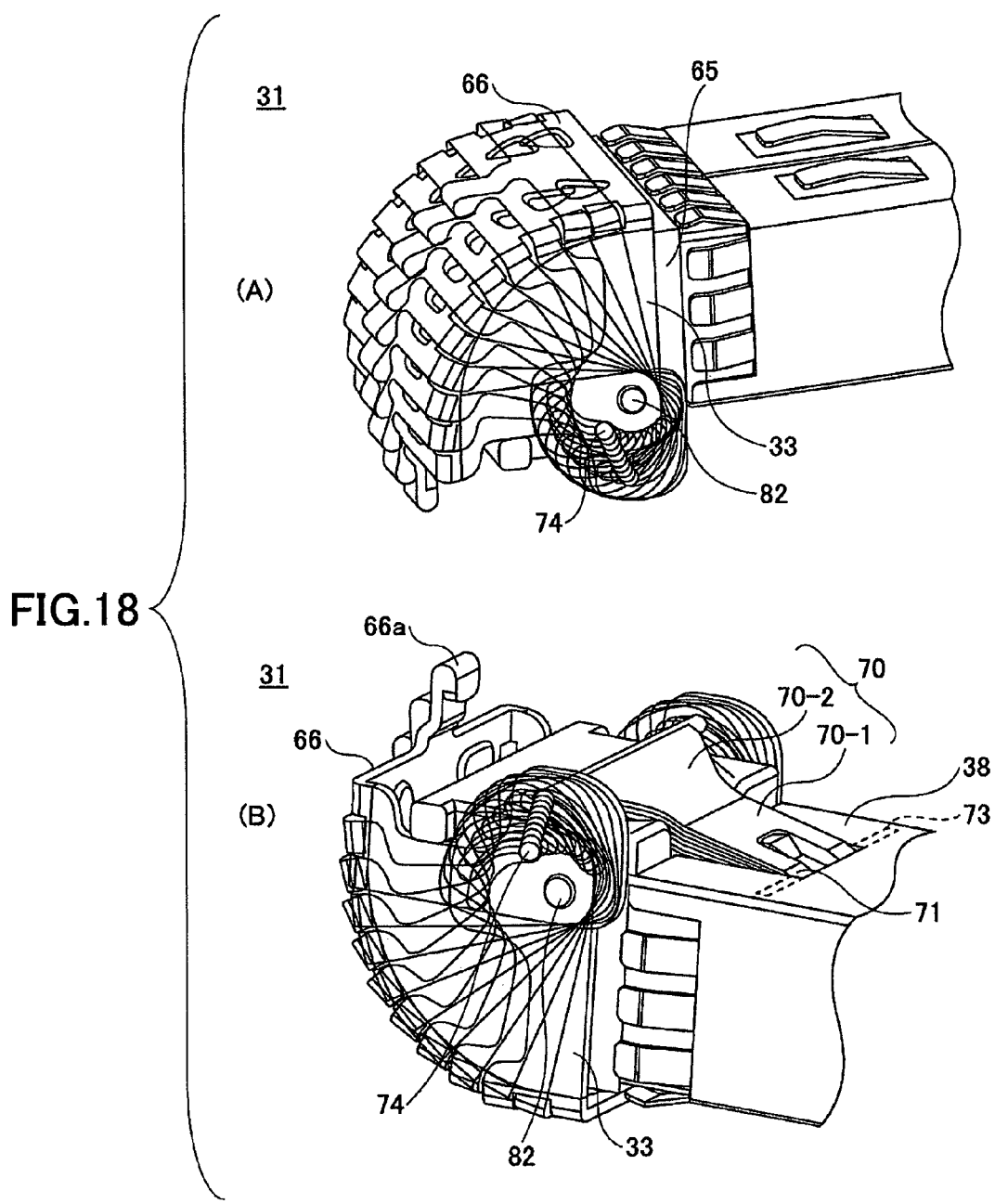
FIG. 18 is a view consecutively showing of the rotation of the bail.

FIG. 18 is a view consecutively showing of the rotational positions of the bails 33. More specifically, FIG. 18(A) is a perspective view of the optical module 31 seen from a front surface side; and FIG. 18(B) is a perspective view of the optical module 31 seen from the engaging part 70-1 of the housing tongue 70.

As shown in FIG. 18, when the bails 33 are rotated with respect to the rotational axel 82 from the state where the cage 32 and the optical module 31 are engaged with each other, following the rotation of the bails 33, the piercing holes 67 of the bails 33 come in contact with the bail connecting pin 74 of the housing tongue 70 provided in the piercing holes 67, so that the piercing connecting pin 74 is pushed down. As a result of this, the housing tongue 70 connected to the housing 64 via the axial part 73 is rotated so that the cage tongue 80 of the cage 32 is urged. Because of this, the engagement of the lock pin 38 with the hole 71 formed in the housing tongue 70 and the lock hole 81 of the cage is released.

In order to realize the above-mentioned mechanism, the configuration of the piercing hole 67 of the bail 33 is defined by, for example, the following.

(1) A position of the end part 67a (see FIG. 9(b)) of the piercing hole 67 coming in contact with the bail connecting pin 74 of the housing tongue 70 and a distance between the rotational axel 82 of the bails 33 and the bail connecting pin 74 of the housing tongue 70, in a state where the optical module 31 and the cage 32 are engaged with each other (the state show in FIG. 9 and FIG. 10);

(2) A position of the end part 67b (see FIG. 16(b)) of the piercing hole 67 coming in contact with the bail connecting pin 74 of the housing tongue 70, a rotational angle of the engaging part 70-1 of the housing tongue 70 with the horizontal surface, and a distance between the rotational axel 82 of the bail 33 and the bail connecting pin 74 of the housing tongue 70, in a position where the engagement of the lock pin 38 with the hole 71 formed in the housing tongue 70 and the lock hole 81 of the cage is released (the position show in FIG. 16 and FIG. 17); and (3) A distance between the axial part 73 of the housing tongue 70 and the bail connecting pin 74.

Because of this configuration, as discussed above, in a state where the optical module 31 and the cage 32 are engaged with each other (the state show in FIG. 9 and FIG. 10), the bail connecting pin 74 comes in contact with the end part 67a of the piercing hole 67 formed in a main surface of the bail 33 in a substantially curved shape. In this state, the bail connecting pin 74 is positioned in a portion where the wall part 68 is provided in a height direction. Accordingly, the access from the outside to the housing tongue 70 in a direction indicated by a black arrow in FIG. 3 is prevented by the wall part 68.

When the bail 33 is rotated in a direction indicated by the arrow 101 (see FIG. 9(B)), the bail connecting pin 74 of the housing tongue 70 comes in contact with the piercing hole 67 and is started being pushed by the piercing hole 67. As a result of this, the bail connecting pin 74 starts moving following the rotation of the bails 33. While the bail connecting pin 74 starts to become visible at the lower surface of the wall part 68, the access from the outside to the housing tongue 70 in a direction indicated by a black arrow in FIG. 3 is prevented by the bail connecting member 66.

Until the engagement of the lock pin 38 with the hole 71 of the housing tongue 70 and the lock hole 81 of the cage 32 is released by rotating the bails 33 in the direction indicated by the arrow 101 (see FIG. 9(B)) 90 degrees from the state shown in FIG. 9 and FIG. 10, the access from the outside to the housing tongue 70 in a direction indicated by a black arrow in FIG. 3 is prevented by the bail connecting member 66.

Figure 1:
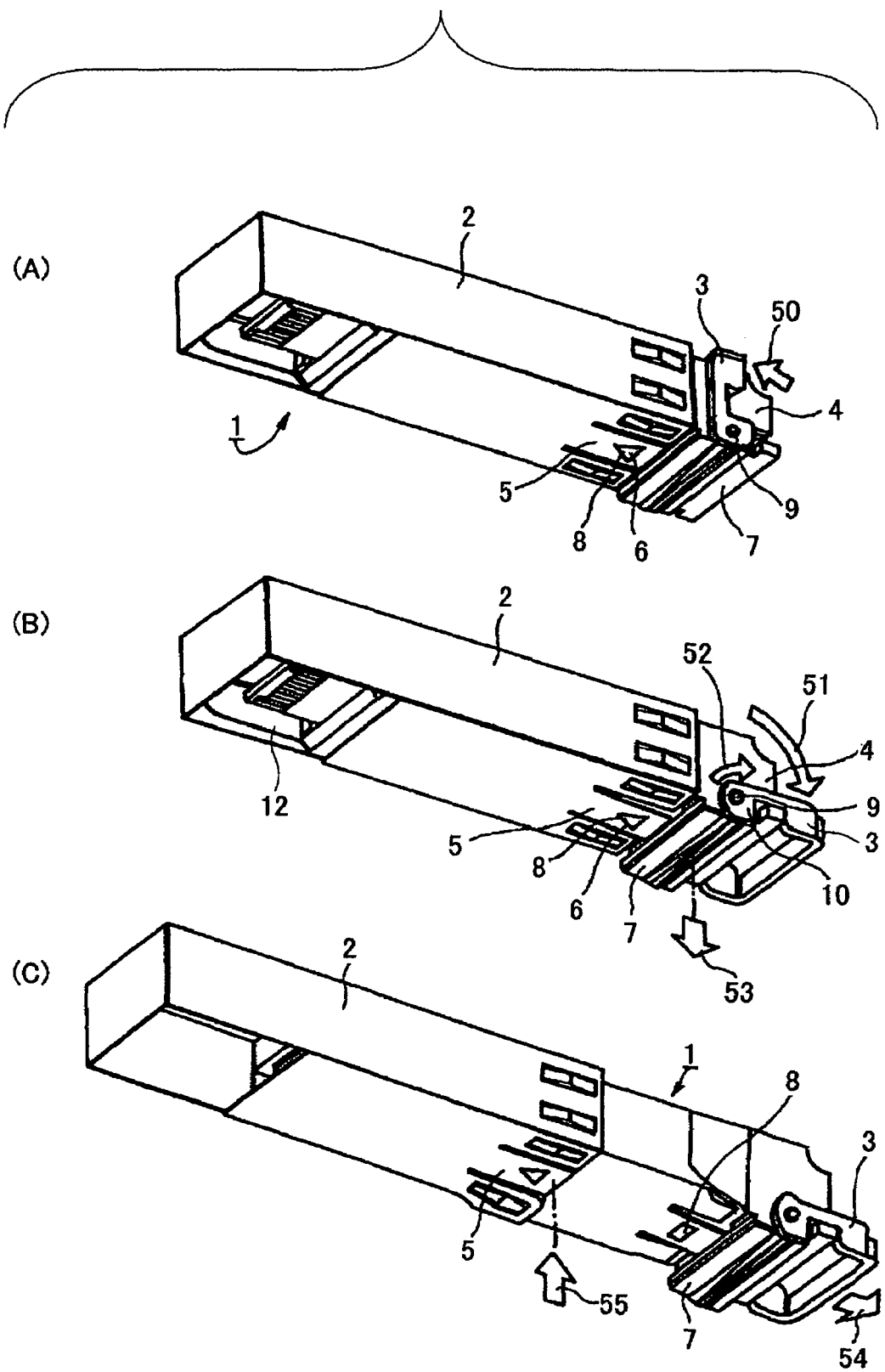
FIG. 1 is a perspective view of an inserting and removing mechanism of an optical communication device designed in a module seen from a lower side.
Figure 2:
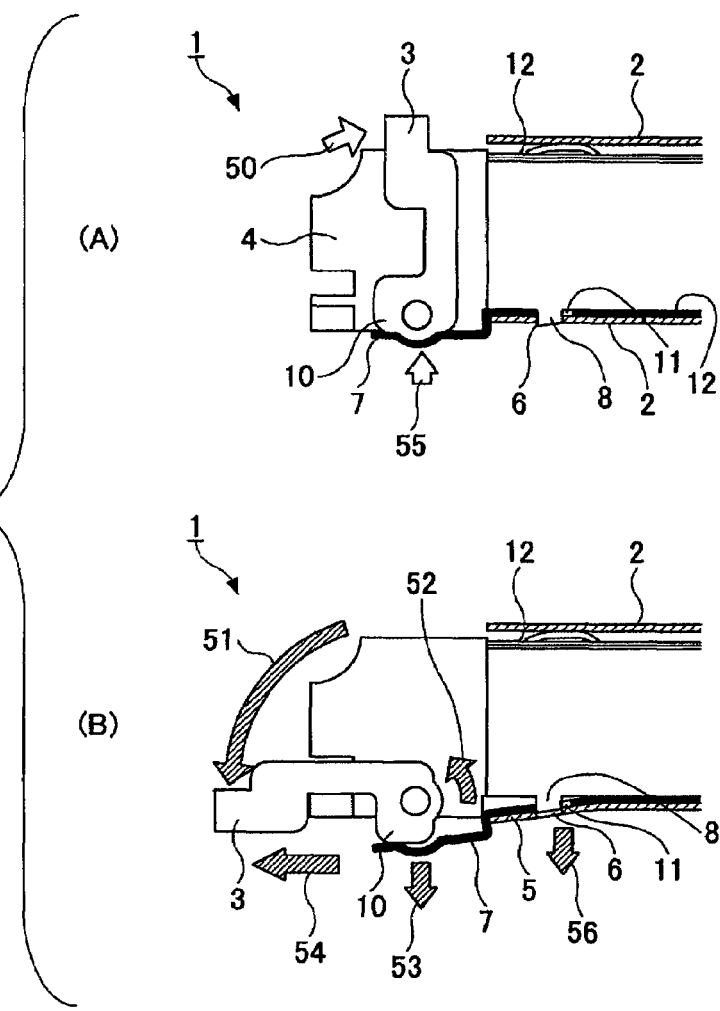
FIG. 2 is a cur-away side view of a main part of the optical module and shows cam operations of a bail shown in FIG. 1.

Thus, according to the optical module 31 of the first embodiment of the present invention, the housing tongue 70 unlike the T-shapes tongue 7 shown in FIG. 1 through FIG. 3 is not made of an elastic member and is connected to the housing 64 by the axial part 73. Accordingly, without degradation with time, it is possible to achieve a stable engaging state of the lock pin 38 and the hole 71 formed in the housing tongue 70 and the lock hole 81 of the cage 32.

In addition, since the housing tongue 70 is rotated with respect to the axial part 73 by following the rotation of the bails 33, a fulcrum of movement of the housing tongue 70 is stable. Hence, release of engagement of the lock pin 38 with the hole 71 formed in the housing tongue 70 and the lock hole 81 of the cage 32 can be done stably.

Furthermore, the access from the outside to the housing tongue 70 in a direction indicated by a black arrow in FIG. 3 is prevented by the wall part 68 in the state shown in FIG. 9 and FIG. 10 where the optical module 31 and the cage 32 are engaged with each other, or by the bail connecting member 66 when the bails 33 are rotated in the direction indicated by the arrow 101 (see FIG. 9(B)).

Accordingly, without making the height of the wall part 68 large, it is possible to prevent the access from the outside to the housing tongue 70 of the optical module 31 while the external measurement of the optical module 31 is within a range defined by the standard MSA.

Second Embodiment of the Present Invention

In the above-discussed first embodiment of the present invention, the piercing holes 67 are formed in the bails 33 provided at two sides of the connector engaging part 65. The bail engaging pin 74 formed in the housing tongue 70 and the piercing holes 67 are in contact with each other so that by rotating the bails 33 the housing tongue 70 is rotated by following the rotation of the bails 33.

However, the present invention is not limited to the above-discussed structure. A piercing hole may be formed in a housing tongue; and a tongue connecting pin formed in a bail and the piercing hole may be in contact with each other so that by rotating the bails the housing tongue is rotated by following the rotation of the bails. In the following explanations, this is discussed as a second embodiment of the present invention.

Figure 19:
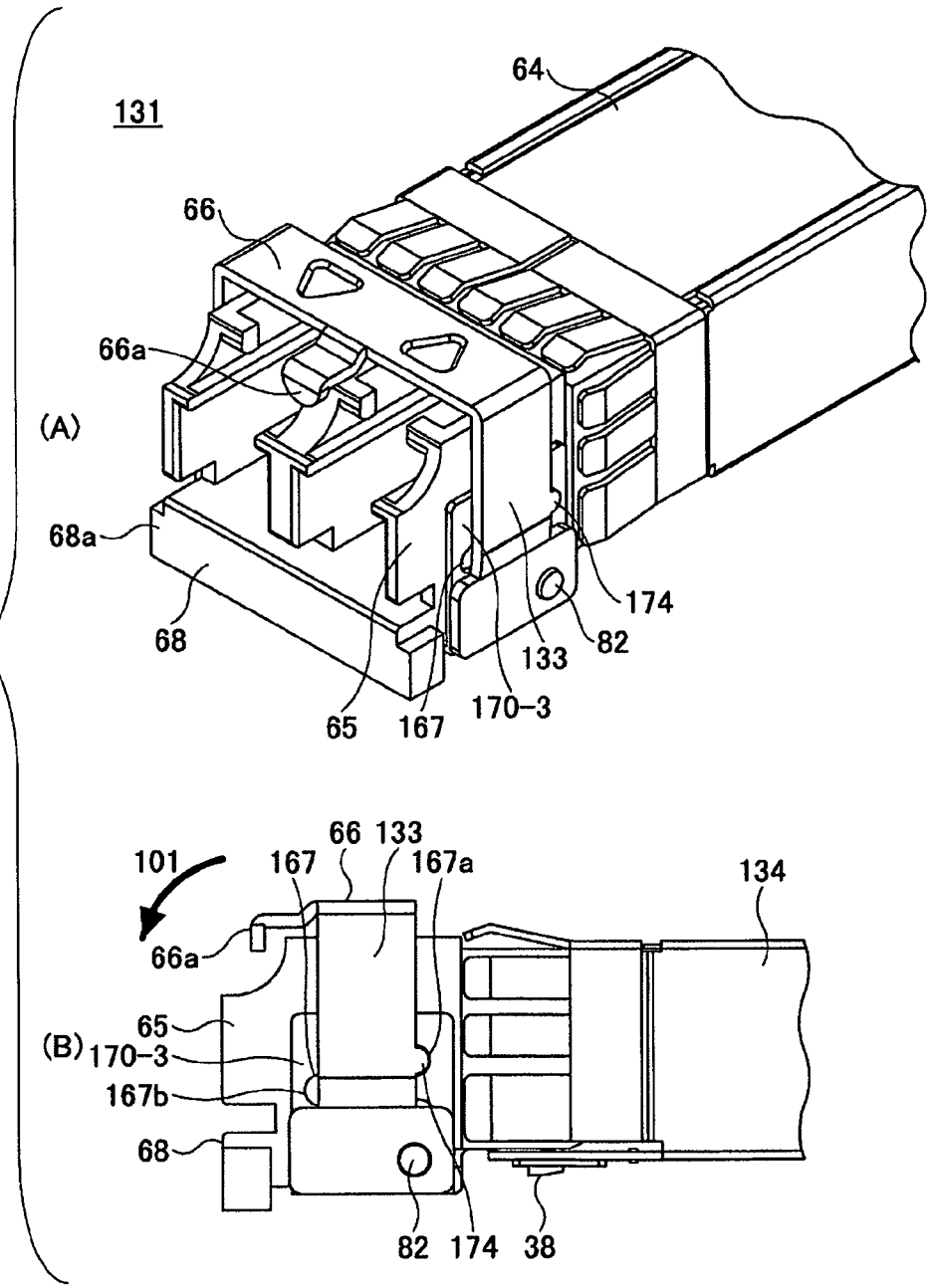
FIG. 19 is a perspective view of an optical module of a second embodiment of the present invention.

FIG. 19 shows an optical module 131 of the second embodiment of the present invention. More specifically, FIG. 19(A) is a partial perspective view of the optical module 131. FIG. 19(B) is a partial side view of the optical module 131. In FIG. 19, parts the same as those of the optical module 331 of the first embodiment of the present invention have the same numerical references in FIG. 19 and their explanation is omitted.

Referring to FIG. 19, in the optical module 131 of the second embodiment of the present invention, the bails 133 are provided at both side surfaces of the connector engaging part 65 of the optical interface part 62 via a bail connecting part 170-3 of the housing tongue 170. The bails 133 are connected to each other by the bail connecting member 66 at the upper part.

The bails 133 are provided at both side surfaces of the connector engaging part 65 so as to be capable of being rotated in a direction indicated by the arrow 101 and its reverse direction a maximum of 90 degrees.

Furthermore, a tongue connecting pin 174 as a stick member extends, in a direction perpendicular to a longitudinal direction of the optical module 131, in a position corresponding to the forming position of a first end part 167a (see FIG. 19(B)) of the piercing hole 167 of the bail connecting part 170-3 of a surface of the bail 133 facing the bail connecting part 170-3 of the housing tongue 170.

More specifically, the length of the tongue connecting pin 174 extending from the surface of the bail 133 facing the bail connecting part 170-3 of the housing tongue 170 is substantially the same as the piercing length of the piercing hole 167 of the bail connecting part 170-3 of the housing tongue 170.

Figure 20:
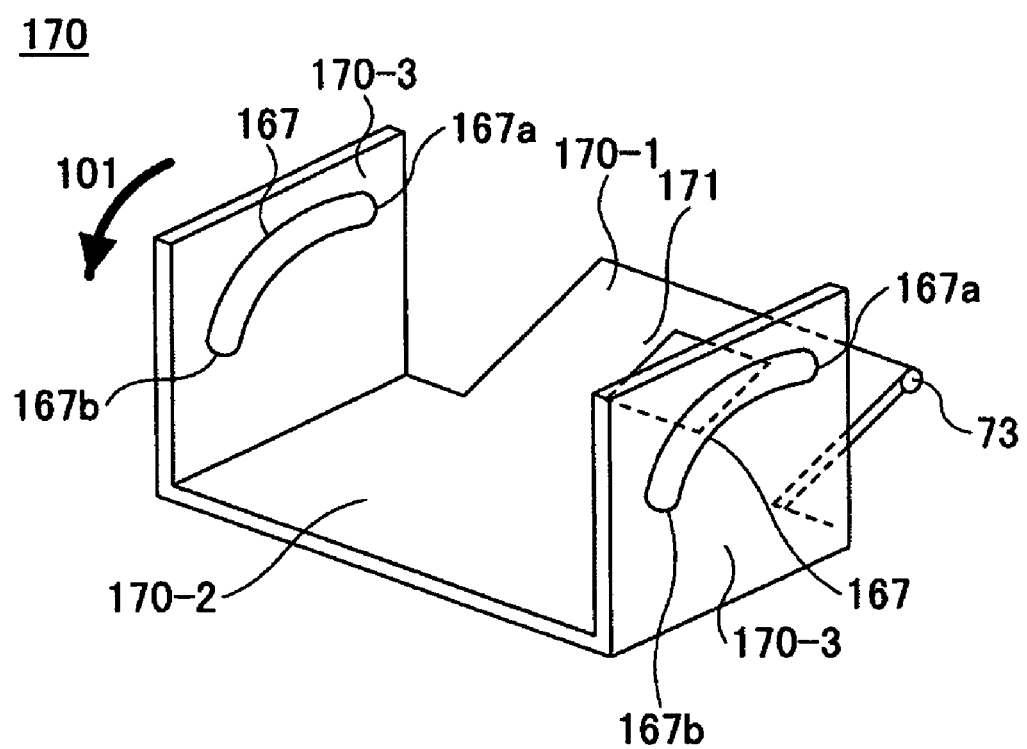
FIG. 20 is a perspective view of a housing tongue of the optical module shown in FIG. 19.

Next, with reference to FIG. 20 in addition to FIG. 19, a structure of the housing tongue 170 is discussed. FIG. 20 is a perspective view of the housing tongue 170 provided in the optical module 131 shown in FIG. 19.

The housing tongue 170 includes an engaging part 170-1, a connector engaging contact part 170-2, and a bail connecting part 170-3. The engaging part 170-1 has a substantially rectangular plan view configuration. The connector engaging contact part 170-2 extends from the engaging part 170-1 to the wall part 68 side of the connector engaging part 65. The bail connecting part 170-3 extends in a vertical direction from the external circumferential part of the connector engaging contact part 170-2 positioned in a longitudinal direction of the optical module 131.

The contactor engaging contact part 170-2 comes in contact with the bottom surface of the connector engaging part 65. The bail connecting parts 170-3 are provided at both side surfaces of the connector engaging part 65 as shown in FIG. 19.

While the engaging part 170-1, the connector engaging contact part 170-2, and the bail connecting parts 170-3 are formed in a body, the connector engaging contact part 170-2 is bent at a designated angle with the engaging part 170-1 and extends from the engaging part 170-1.

The hole 171 is formed in the substantially center part in a direction perpendicular to a direction of the engaging part 170-1. The lock pin 38 is inserted into and removed from the hole 171 and the lock hole 81 of the cage 32 so that engagement and release of the engagement of the optical module 131 and the cage 32 are made.

The axial part 73 is provided at the external circumferential part, opposite to the part where the connector engaging contact part 170-2, in the engaging part 170-1.

The piercing holes 167 are formed in the bail connecting parts 170-3.

As discussed above, in a position corresponding to the position of the end parts 167a (see FIG. 19(B)) of the piercing holes 167, the tongue connecting pins 174 having the same length as the piercing length of the piercing holes 167 extend in a direction perpendicular to the longitudinal direction of the optical module 131. The tongue connecting pins 174 are inserted into the piercing holes 167 of the bails 133.

In the housing tongue 170 having the above-discussed structure, the bails 13 are rotated in the direction indicated by the arrow 101 in FIG. 19(B) so that the tongue connecting pins 174 of the bails 133 move downward. When the tongue connecting pins 174 come in contact with second end parts 167b positioned at opposite sides of the first end parts 167a of the piercing holes 167 formed in the bail connecting parts 170-3 of the housing tongue 170, the entire housing tongue 170 is rotated in the direction indicated by the arrow 101 with respect to the axial part 73 of the engaging part 170-1.

This structure is discussed with reference to FIG. 21 through FIG. 26.

Figure 21:
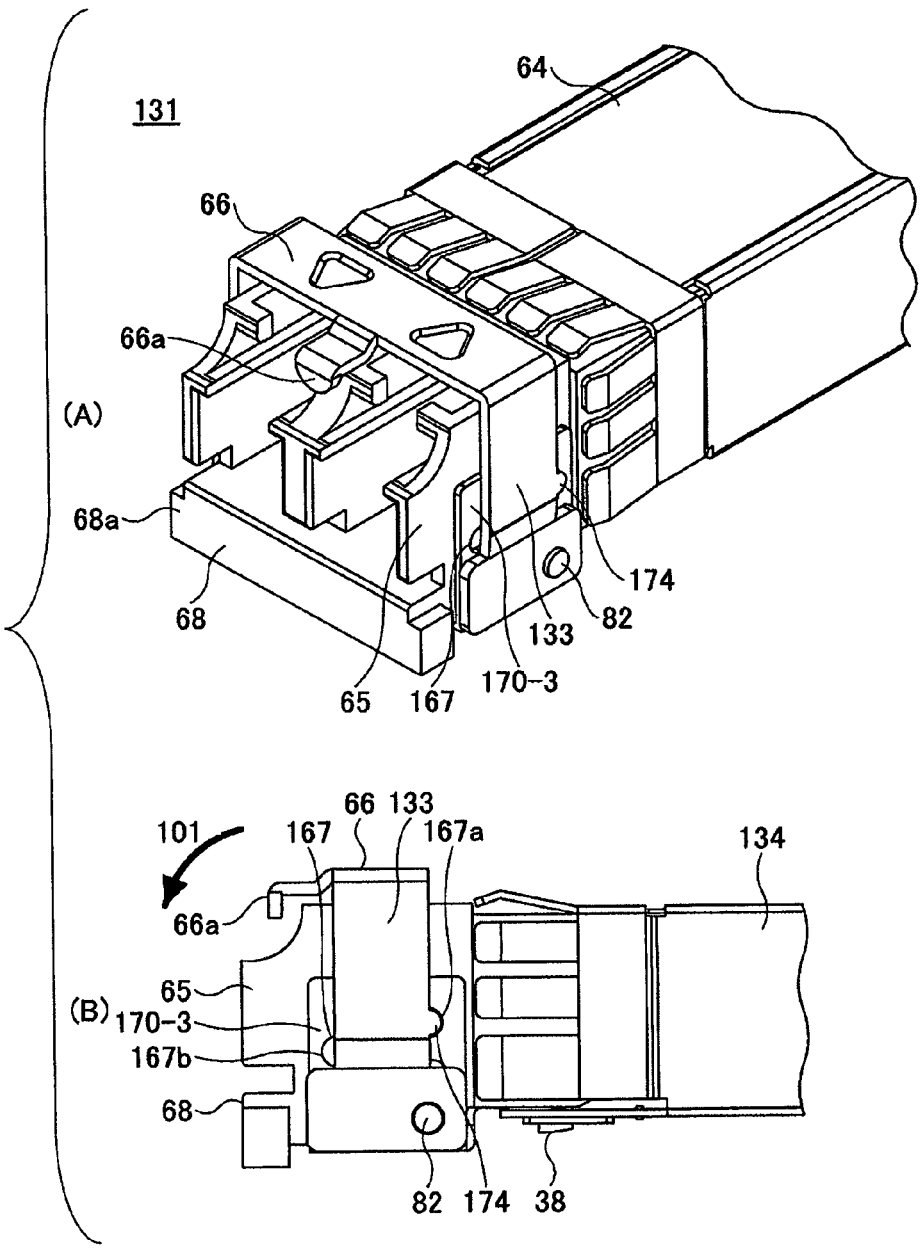
FIG. 21 is a first view showing a state where the optical module shown in FIG. 19 and the cage are engaged with each other.
Figure 22:
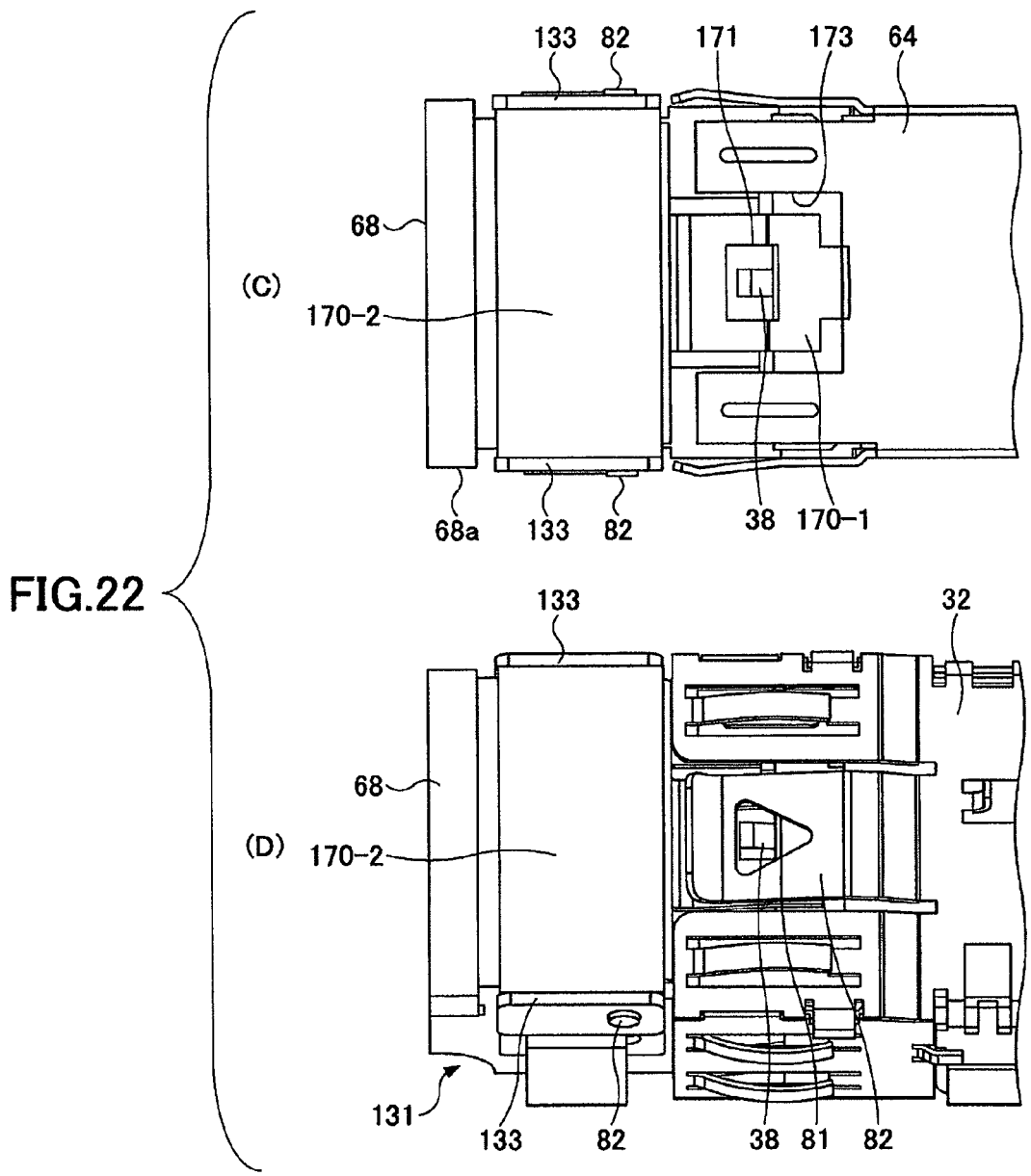
FIG. 22 is a second view showing a state where the optical module shown in FIG. 19 and the cage are engaged with each other.

FIG. 21 and FIG. 22 show a state where the bails 33 are received so that the optical module 131 and the cage 32 are engaged with each other.

More specifically, FIG. 21(A) is a perspective view of the optical module 131 in the state where the bails 33 are received so that the optical module 131 and the cage 32 are engaged with each other. FIG. 21(B) is a side view of the optical module 131 in the state where the bails 33 are received so that the optical module 131 and the cage 32 are engaged with each other. FIG. 21(C) is a bottom view of the optical module 131 in the state where the bails 33 are received so that the optical module 131 and the cage 32 are engaged with each other. FIG. 21(D) is a bottom view of the optical module 131 and the cage 32 in the state where the bails 33 are received so that the optical module 131 and the cage 32 are engaged with each other.

In the state shown in FIG. 21 and FIG. 22, the lock pin 38 of the optical module 131 is inserted into the hole 171 formed in the housing tongue 170 and the lock hole 81 of the cage tongue 80 so that the optical module 131 and the cage 32 are engaged with each other.

In this state, the tongue connecting pin 174 of the bails 133 come in contact with the end parts 167*a* of the piercing holes 167 formed in the bail connecting parts 170-3 in the substantially curved shape of the housing tongue 170. In addition, the connector engaging contact part 170-2 of the housing tongue 170 is positioned in the height direction in a part where the wall part 68 is provided. Accordingly, the access from the outside to the housing tongue 170 in a direction indicated by a black arrow in FIG. 3 is prevented by the wall part 68.

Figure 23:
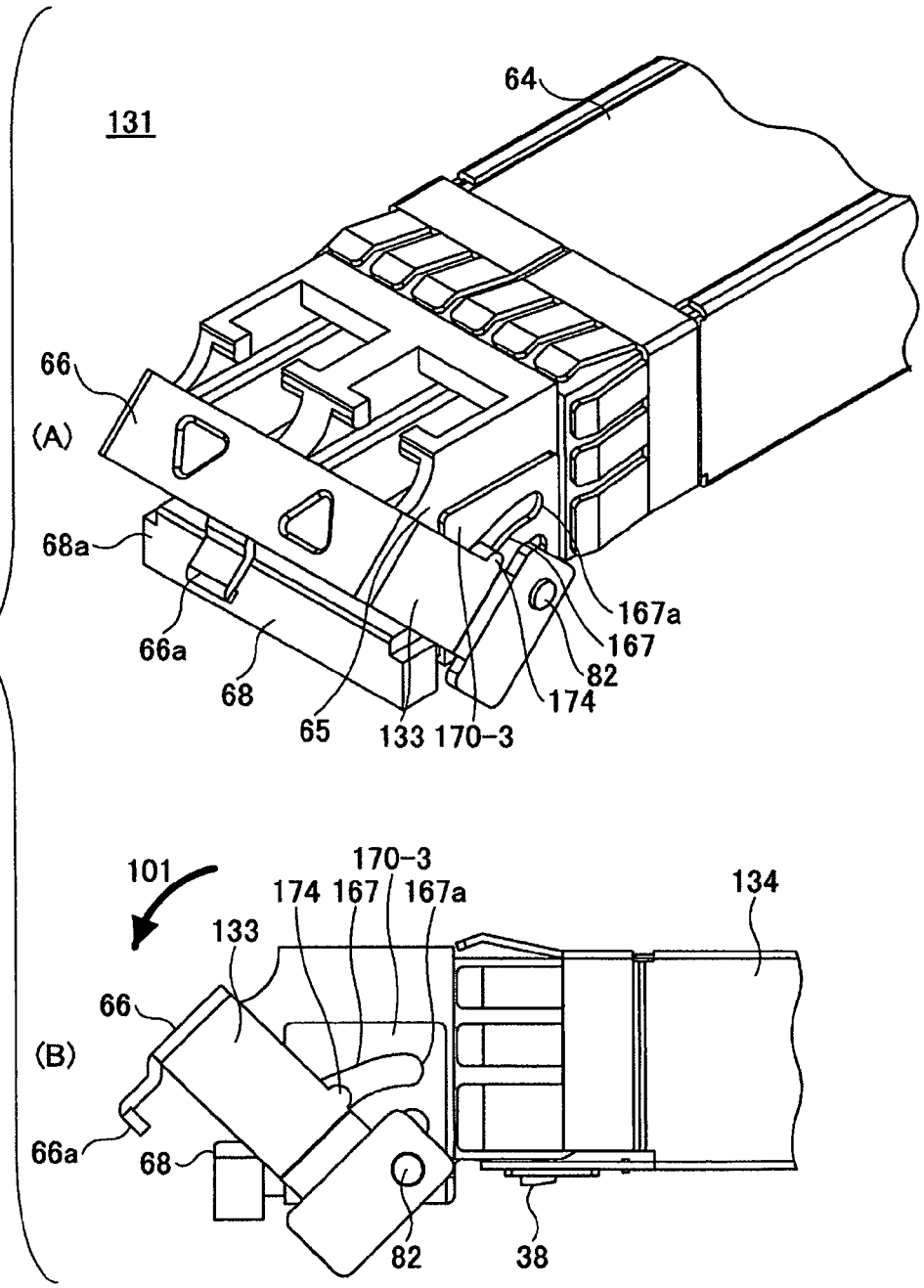
FIG. 23 is a first view showing where the bail is rotated 45 degrees from the state shown in FIG. 21 and FIG. 22.
Figure 24:
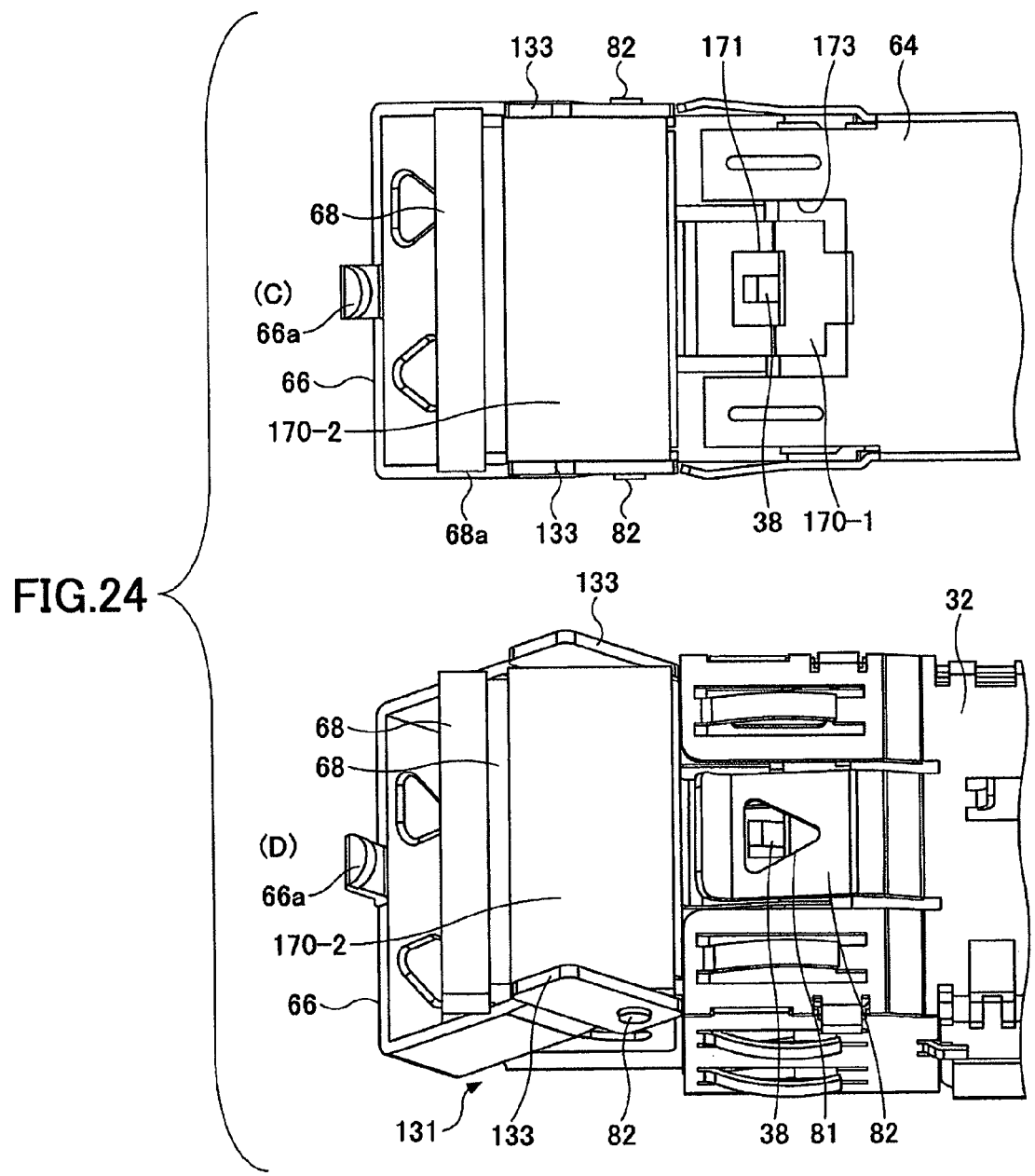
FIG. 24 is a second view showing where the bail is rotated 45 degrees from the state shown in FIG. 21 and FIG. 22.
Figure 25:
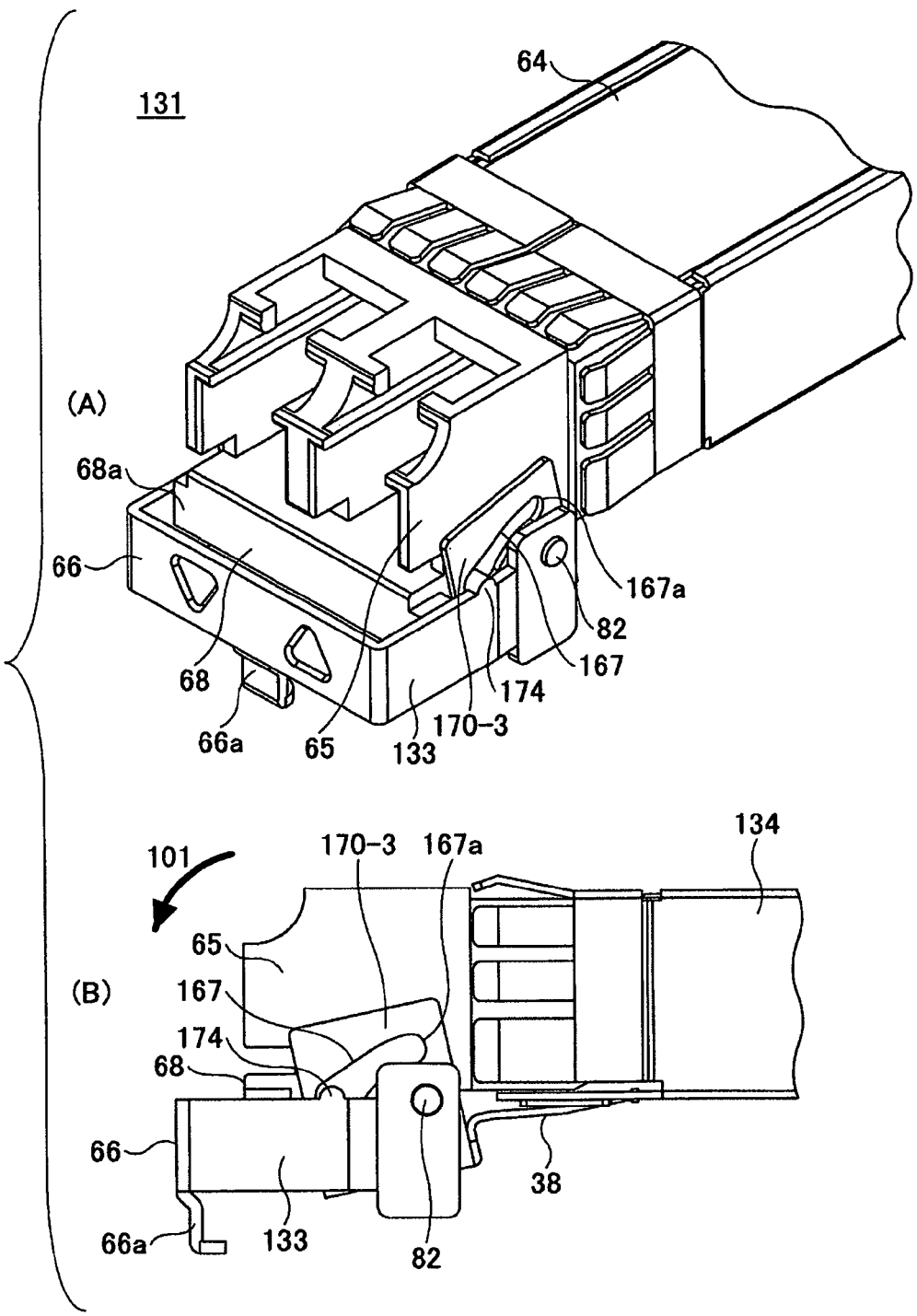
FIG. 25 is a first view showing where the bail is rotated 90 degrees from the state shown in FIG. 21 and FIG. 22.
Figure 26:
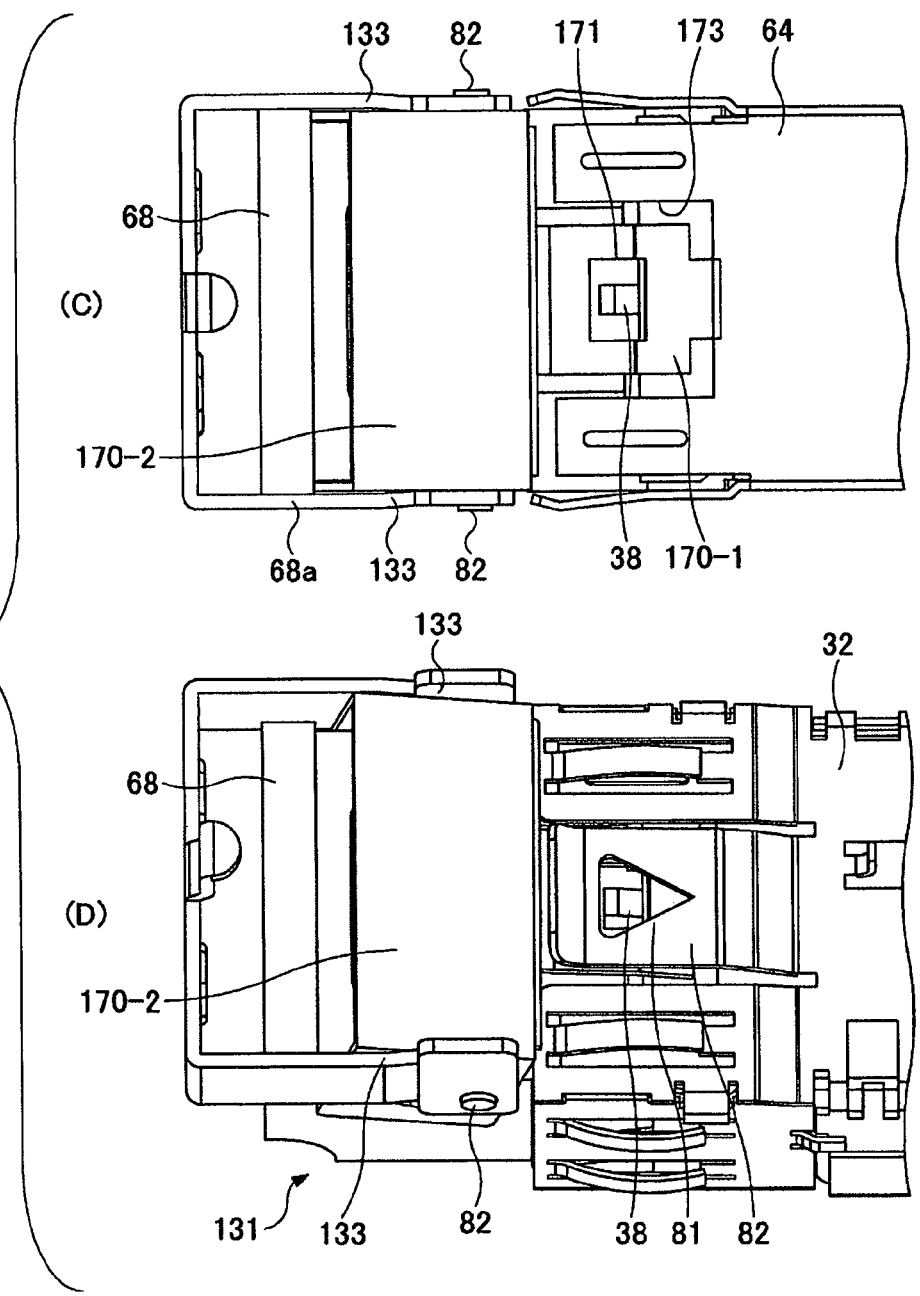
FIG. 26 is a second view showing where the bail is rotated 90 degrees from the state shown in FIG. 21 and FIG. 22.

Next, a position where the bails 133 are rotated 45 degrees in the direction indicated by the arrow 101 (see FIG. 19(B)) from the engaged state shown in FIG. 21 and FIG. 22 is shown in FIG. 23 and FIG. 24.

More specifically, FIG. 21(A) is a perspective view of the optical module 131 in the position where the bails 133 are rotated 45 degrees in the direction indicated by the arrow 101 (see FIG. 19(B)) from the state shown in FIG. 21 and FIG. 22. FIG. 21(B) is a side view of the optical module 131 in the position where the bails 133 are rotated 45 degrees in the direction indicated by the arrow 101 (see FIG. 19(B)) from the state shown in FIG. 21 and FIG. 22. FIG. 21(C) is a bottom view of the optical module 131 in the position where the bails 133 are rotated 45 degrees in the direction indicated by the arrow 101 (see FIG. 19(B)) from the state shown in FIG. 21 and FIG. 22. FIG. 21(D) is a bottom view of the optical module 131 and the cage 32 in the position where the bails 133 are rotated 45 degrees in the direction indicated by the arrow 101 (see FIG. 19(B)) from the state shown in FIG. 21 and FIG. 22.

In this position, while the tongue connecting pins 174 of the bails 133 are separated from the end parts 167*a* of the piercing holes 167, the connector engaging contact part 170-2 of the housing tongue 170 is positioned in the height direction in a part where the wall part 68 is provided. Accordingly, the access from the outside to the housing tongue 170 in a direction indicated by a black arrow in FIG. 3 is prevented by the wall part 68.

When the bails 133 are further rotated in this position in the direction indicated by the arrow 101 (see FIG. 23(B)), namely approximately 60 degrees from the state shown in FIG. 21 and FIG. 22, the tongue connecting pins 174 of the bails 133 come in contact with the end parts 167*b* of the piercing holes 167. The end parts 167*a* of the piercing holes 167 are started being pushed by the tongue connecting pins 174 of the bails 133 so as to start moving by following the rotation of the bails 133.

When the bails 133 are further rotated in the direction indicated by the arrow 101 (see FIG. 23(B)), a part at the wall part 68 side of the connector engaging contact part 170-2 of the housing tongue 170 is started being visible from the lower surface of the wall part 68.

In order to securely achieve the release of engagement of the optical module 131 and the cage 32, it is necessary to remove the lock pin 38 from the hole 171 of the engaging part 170-1 and the lock hole 81 of the cage 32. Because of this, it is possible to move the connector engaging contact part 170-2 of the housing tongue 70 downward. On the other hand, it is necessary to prevent the access indicated by a black arrow in FIG. 3 from the outside to the housing tongue 70.

As discussed above, the height of the wall part 68 has limitations according to the standard MSA. Therefore, it is not possible to make the wall part 68 have a height greater than the designated length. Accordingly, in this position, it is not possible to prevent the access from the outside to the housing tongue 170 by the wall part 68.

However, assuming that the optical module 131 is seen from a front surface, the bail connecting member 66 connecting the bails 133 to each other is positioned so as to substantially overlap the connector engaging contact part 170-2 of the housing tongue 170. Accordingly, the access from the outside to the housing tongue 70 in a direction indicated by a black arrow in FIG. 3 is prevented by the bail connecting member 66.

Thus, when the bails 133 are rotated in the direction indicated by the arrow 101 (see FIG. 23(B)) 90 degrees from the state shown in FIG. 21 and 22, the housing 170 is rotated by following this. As a result of this, the cage tongue 80 is urged by following the rotation of the housing tongue 170. Because of this, the engagement of the lock pin 38 with the hole 171 of the housing tongue 170 and the lock hole 81 of the cage 32 is released so that the optical module 131 can be pulled out and removed from the cage 32.

In order to realize the above-mentioned mechanism, the configuration of the piercing holes 167 formed in the bail connecting parts 170-3 of the housing tongue 170 is defined by, for example, the following.

(1) A position of the end parts 167*a* (see FIG. 19(*b*)) of the piercing holes 167 coming in contact with the tongue connecting pins 174 of the bails 133 and a distance between the rotational axel 74 of the housing tongue 170 and the tongue connecting pin 174 of bails 133, in a state where the optical module 131 and the cage 132 are engaged with each other (the engaged state shown in FIG. 21 and FIG. 22);

(2) A position of the end parts 167*b* (see FIG. 19(B)) of the piercing holes 167 coming in contact with the tongue connecting pins 174 of the bails 133, a rotational angle of the engaging part 170-1 of the housing tongue 170 with the horizontal surface, and a distance between the rotational axel 173 of the housing tongue 170 and the tongue connecting pins 174 of the bails 133, in a position where the engagement of the lock pin 138 with the hole 171 formed in the housing tongue 170 and the lock hole 181 of the cage 32 is released (the position show in FIG. 25 and FIG. 26); and (3) A distance between the axial part 82 of the bails 133 and the tongue connecting pins 174.

Because of this configuration, as discussed above, in a state where the optical module 131 and the cage 32 are engaged with each other (the state show in FIG. 21 and FIG. 22), the bail connecting pins 174 come in contact with the end parts 167*a* of the piercing holes 167 formed in main surfaces of the bail connecting parts 170-3 in a substantially curved shape. In this state, the connector engaging contact part 170-2 of the housing tongue 170 is positioned in a portion where the wall part 68 is provided in a height direction. Accordingly, the access from the outside to the housing tongue 170 in a direction indicated by a black arrow in FIG. 3 is prevented by the wall part 68.

When the bails 133 are rotated in a direction indicated by the arrow 101 (see FIG. 21(B)), the tongue connecting pins 174 of the bail 133 come in contact with the end parts 167*b* of the piercing holes 167. The end parts 167*b* of the piercing holes 167 are started being pushed by the tongue connecting pins 174 of the bails 133 and start moving by following the rotation of the bail 133. While the wall part 68 side of the connector engaging contact part 170-2 of the housing tongue 170 is started being visible from the lower surface of the wall part 68 when the bails 13 are further rotated in the direction indicated by the arrow 101 (see FIG. 21(B)), the access from the outside to the housing tongue 170 in a direction indicated by a black arrow in FIG. 3 is prevented by the bail connecting member 66.

Until the engagement of the lock pin 38 with the hole 171 of the housing tongue 170 and the lock hole 81 of the cage 32 is released by rotating the bails 133 in the direction indicated by the arrow 101 (see FIG. 21(B)) 90 degrees from the state shown in FIG. 21 and FIG. 22, the access from the outside to the housing tongue 170 in a direction indicated by a black arrow in FIG. 3 is prevented by the bail connecting member 66.

Thus, according to the optical module 131 of the second embodiment of the present invention, the housing tongue 170 unlike the T-shaped tongue 7 shown in FIG. 1 through FIG. 3 is not made of an elastic member and is connected to the housing 64 by the axial part 173. Accordingly, without degradation with time, it is possible to achieve a stable engaging state of the lock pin 138 and the hole 171 formed in the housing tongue 170 and the lock hole 81 of the cage 32.

In addition, since the housing tongue 170 is rotated with respect to the axial parts 173 by following the rotation of the bails 133, a fulcrum of movement of the housing tongue 170 is stable. Hence, release of engagement of the lock pin 38 with the hole 171 formed in the housing tongue 170 and the lock hole 81 of the cage 32 can be done stably.

Furthermore, the access from the outside to the housing tongue 170 in a direction indicated by a black arrow in FIG. 3 is prevented, by the wall part 68 in the state shown in FIG. 21 and FIG. 22 where the optical module 131 and the cage 32 are engaged with each other, or by the bail connecting member 66 when the bails 133 are rotated in the direction indicated by the arrow 101 (see FIG. 21(B)).

Accordingly, without making the height of the wall part 68 large, it is possible to prevent the access from the outside to the housing tongue 170 of the optical module 131 while the external measurement of the optical module 131 is within a range defined by the standard MSA.

Although the invention has been described with respect to specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-74861 filed on Mar. 22, 2007, the entire contents of which are hereby incorporated by reference.

What is claimed is:

1. An optical module which can be inserted into and removed from a cage, the optical module comprising:
   a lock pin inserted into a lock hole provided in the cage and engaging the cage and the optical module with each other in a state where the optical module is inserted into the cage;
   a tongue having an axial part and configured to be rotated with respect to the axial part in a direction where the insertion of the lock pin into the lock hole is released; and
   a bail configured to be rotated with respect to a rotational axel so that the tongue is rotated;
   wherein the engagement of the cage and the optical module formed by insertion of the lock pin into the lock hole is released by rotating the bail 90 degrees,
   the tongue includes an engaging part and a bail connecting part,
   the bail connecting part is bent at the engaging part with a designated angle and extends from the engaging part, and
   the width of the bail connecting part is wider as the bail connecting part is far from the engaging part.

2. The optical module as claimed in claim 1,
   wherein the tongue includes a stick member,
   the bail is provided at a side surface of the optical module, and
   the stick member of the tongue is positioned in a piercing hole formed in a main surface of the bail.

3. The optical module as claimed in claim 2,
   wherein the tongue is rotated with respect to the axial part in a case where the bail is rotated a designated angle so that a circumferential part of the piercing hole pushes the stick member of the tongue.

4. The optical module as claimed in claim 2, Wherein,
   in the engaging part, the axial part is provided at an external circumferential part situated opposite to where the bail connecting part is provided, and
   in the bail connecting part, the stick member is provided at a part opposite to where the engaging part is provided.

5. The optical module as claimed in claim 2,
   wherein, in the state where the cage and the module are engaged with each other, the stick member of the tongue comes in contact with a first end part of the piercing hole formed in the main surface of the bail.

6. The optical module as claimed in claim 2,
   wherein, by rotating the bail 90 degrees, the stick member of the tongue comes in contact with a second end part of the piercing hole formed in the main surface of the bail so that rotation of the tongue is stopped.

7. The optical module as claimed in claim 1,
   wherein a wall part is provided at a lower part of the optical module,
   two of the bails are provided one on each of two side surfaces of the optical module and are connected to each other by a bail connecting member at an upper part;
   the bail connecting member is rotated with the bails in a body,
   in the state where the optical module and the cage are engaged with each other, contact from a front surface side of the optical module to the tongue is prevented by the wall part, and
   in a position where the bails are rotated, contact from the front surface side of the optical module to the tongue is prevented by the bail connecting member.

8. The optical module as claimed in claim 1,
   wherein the tongue includes a bail connecting part positioned on a side surface of the optical module;
   a piercing hole is formed in the bail connecting part;
   the bail is provided over the bail connecting part and has a stick member; and
   the stick member of the bail is positioned in the piercing hole formed in the bail connecting part of the tongue.

9. The optical module as claimed in claim 8,
   wherein the tongue is rotated with respect to the axial part in a case where the bail is rotated a designated angle so that the stick member of the bail pushes a circumferential part of the piercing hole.

* * * * *

UNITED STATES PATENT AND TRADEMARK OFFICE
CERTIFICATE OF CORRECTION

PATENT NO. : 7,517,160 B2  Page 1 of 1
APPLICATION NO. : 12/068744
DATED : April 14, 2009
INVENTOR(S) : Makoto Miyoshi et al.

It is certified that error appears in the above-identified patent and that said Letters Patent is hereby corrected as shown below:

Column 18, Lines 17-22, change
"4. The optical module as claimed in claim 2, Wherein,
in the engaging part, the axial part is provided at an external
    circumferential part situated opposite to where the bail
    connecting part is provided, and
in the bail connecting part, the stick member is provided at
    a part opposite to where the engaging part is provided." to
--4. The optical module as claimed in claim 2,
wherein, in the engaging part, the axial part is provided at an external
    circumferential part situated opposite to where the bail
    connecting part is provided, and
in the bail connecting part, the stick member is provided at
    a part opposite to where the engaging part is provided.--.

Signed and Sealed this

Eighteenth Day of August, 2009

David J. Kappos
*Director of the United States Patent and Trademark Office*